(12) United States Patent
Yoshizawa et al.

(10) Patent No.: US 6,955,861 B2
(45) Date of Patent: Oct. 18, 2005

(54) FUEL CELL SYSTEM, AND METHOD OF PROTECTING A FUEL CELL FROM FREEZING

(75) Inventors: Koudai Yoshizawa, Yokosuka (JP); Akihiro Iiyama, Zushi (JP); Shugo Higashi, Yokoama (JP); Patrick L. Hagans, Columbia, CT (US)

(73) Assignees: Nissan Motor Co., Ltd., Kanagawa (JP); UTC Fuel Cells, LLC, South Windsor, CT (US)

( * ) Notice: Subject to any disclaimer, the term of this patent is extended or adjusted under 35 U.S.C. 154(b) by 81 days.

(21) Appl. No.: 10/083,606

(22) Filed: Feb. 27, 2002

(65) Prior Publication Data

US 2003/0162063 A1 Aug. 28, 2003

(51) Int. Cl.[7] .............................................. H01M 8/12
(52) U.S. Cl. .............................. 429/26; 429/24; 429/38
(58) Field of Search ............................. 429/26, 24, 22, 429/23, 38, 120

(56) References Cited

U.S. PATENT DOCUMENTS 6,248,462 B1 * 6/2001 Bonville ...................... 429/24

2001/0055707 A1    12/2001 Roberts et al.

FOREIGN PATENT DOCUMENTS

| JP | 7169476 | 7/1995 |
| JP | 7-169476 | 7/1995 |
| JP | 8273689 | 10/1996 |
| WO | WO 02/01662 A1 | 1/2002 |
| WO | WO 03/081704 A2 | 10/2003 |

* cited by examiner

Primary Examiner—Raymond Alejandro
(74) Attorney, Agent, or Firm—McDermott Will Emery LLP

(57) ABSTRACT

A fuel cell system includes a fuel cell (1) having a water passage and passage for gas required for power generation, a first protection device (5, 10) which prevents freezing of water in the fuel cell by maintaining the temperature of the fuel cell (1), and a second protection device (11, 12) which prevents freezing of water in the fuel cell by discharging the water in the fuel cell (1). A controller (50) selects one of the first protection device (5, 10) and the second protection device (11, 12) as the protection device to be used when the fuel cell (1) has stopped, and the fuel cell (1) is protected from freezing of water by operating the selected protection device.

27 Claims, 30 Drawing Sheets

FIG. 5

FUEL CELL SYSTEM, AND METHOD OF PROTECTING A FUEL CELL FROM FREEZING

FIELD OF THE INVENTION

This invention relates to a fuel cell system, and in particular, protection of a fuel cell from freezing of water when the fuel cell has stopped.

BACKGROUND OF THE INVENTION

A fuel cell is a device which directly converts fuel energy into electricity. In the fuel cell, an anode gas passage and cathode gas passage are provided on both sides of an electrolyte membrane. When hydrogen is supplied to the anode gas passage and oxygen is supplied to the cathode gas passage, electrical energy can be extracted according to the following electrochemical reaction occurring on the surface of the electrolyte membrane.

Anode reaction: $H_2 \rightarrow 2H^+ + 2e^-$ 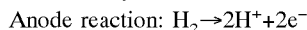

Cathode reaction: $2H^+ + 2e^- + (½)O_2 \rightarrow H_2O$ 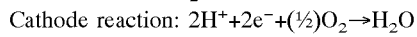

As it is necessary to maintain optimal humidification of the electrolyte membrane in order to extract the performance of the electrolyte membrane and improve the power generation efficiency of the fuel cell, the gas supplied to the fuel cell is humidified. Pure water is used as the water for humidification. This is because if the water contains impurities, the impurities will adhere to the electrolyte membrane and the performance of a fuel cell will be reduced.

SUMMARY OF THE INVENTION

When pure water is used as the water for humidification, and the fuel cell is placed in an environment where the temperature is below the freezing point (=0° C.), the pure water in the cell freezes. As the volume will expand relative to that of the water in the liquid phase if the water freezes, freezing of the water in the cell may destroy the fuel cell.

JP-A-H7-169476 published by the Japanese Patent Office in 1995 discloses a method of protecting a fuel cell from the freezing of water by keeping the fuel cell warm. This method prevents the freezing of the water in the fuel cell by warming the fuel cell using a heater, so that the temperature of the fuel cell does not fall below 0° C. However, by this method, if the fuel cell stops running for a long time, the heater will operate for a long time, and the energy required for protecting the fuel cell becomes very large.

It is therefore an object of this invention to protect a fuel cell from the freezing of water, and at the same time, reduce the amount of energy required for protection.

In order to achieve above object, this invention provides a fuel cell system, comprising a fuel cell having a water passage and a passage for gas required to generate power, a first protection device which prevents freezing of water in the fuel cell by maintaining the temperature of the fuel cell, a second protection device which prevents freezing of water in the fuel cell by draining water in the fuel cell, and a controller functioning to select one of the first protection device and second protection device as the protection device to be used when the fuel cell has stopped, and protect the fuel cell by operating the selected protection device when the fuel cell has stopped.

According to an aspect of this invention, this invention provides a method of protecting a fuel cell from freezing of water, comprising selecting one of a first protection method and a second protection method, preventing freezing of water in the fuel cell by maintaining the temperature of the fuel cell when the first protection method is selected, and preventing freezing of water in the fuel cell by draining the water in the fuel cell when the second protection method is selected.

The details as well as other features and advantages of this invention are set forth in the remainder of the specification and are shown in the accompanying drawings.

DESCRIPTION OF THE PREFERRED EMBODIMENTS

Figure 1:
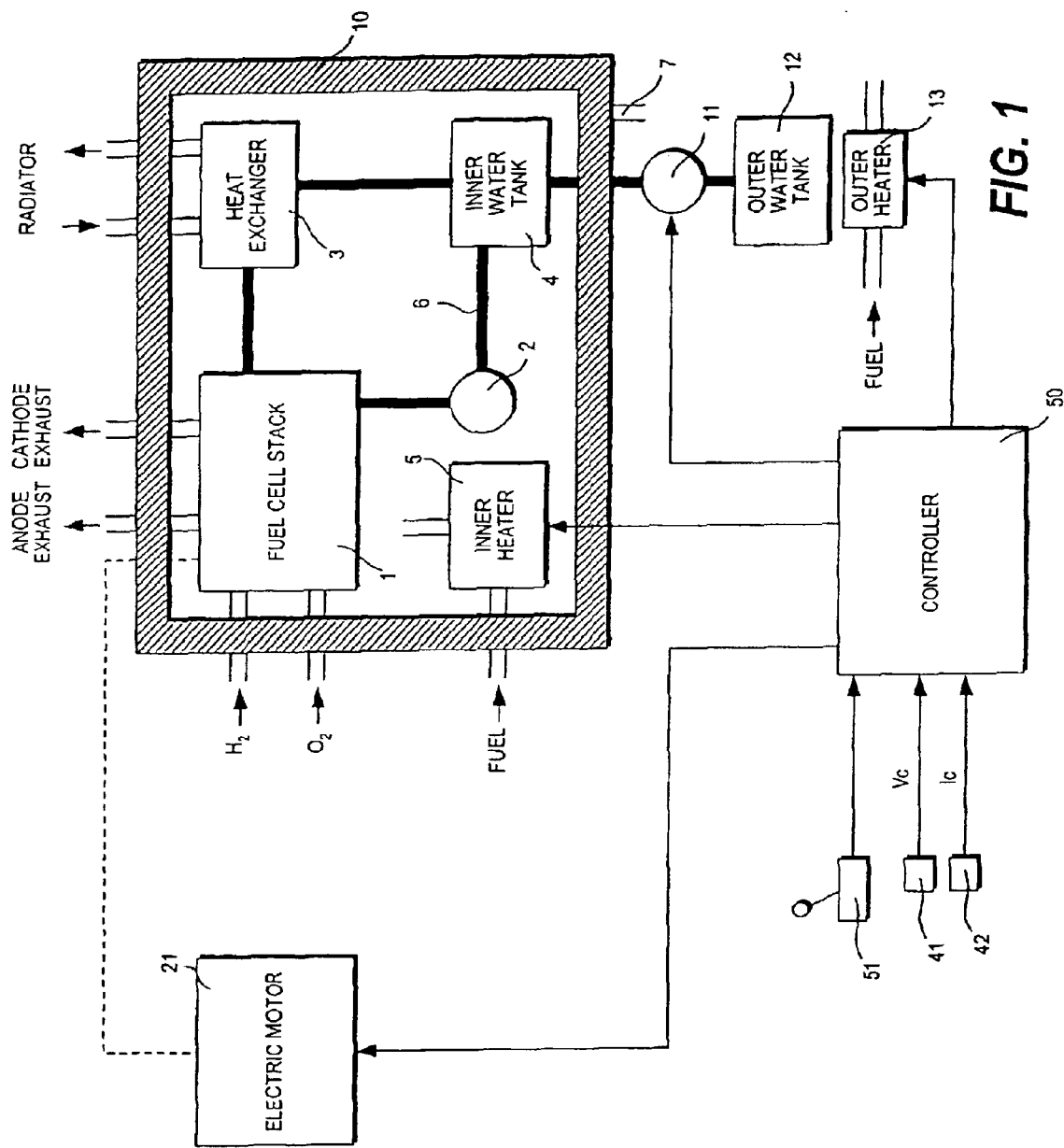
FIG. 1 is a schematic diagram of a fuel cell system relating to this invention.

Referring to FIG. 1 of the drawings, a fuel cell system for vehicles relating to this invention is provided with a fuel cell stack 1, a circulation pump 2, a heat exchanger 3, an inner water tank 4 and an inner heater 5, these being housed in a heat insulating case 10 made of thermal insulation. The inner water tank 4 is installed below the fuel cell stack 1 due to the ease of recovering water from the fuel cell stack 1. The inner heater 5 is installed in the lower part of the heat insulating case 10 due to the temperature rise effect in the heat insulating case 10. A connection port 7 for making air circulate inside and outside the heat insulating case 10, is also provided in the heat insulating case 10.

A pump 11, outer water tank 12 and outer heater 13 are provided outside the heat insulating case 10. The outer water tank 12 is installed below the heat insulating case 10 due to the ease of draining water from the inner water tank 4. The outer heater 13 is used for heating the outer water tank 12, and is installed in contact with or in the vicinity of the outer water tank 12.

A load 21 is electrically connected to the fuel cell stack 1. The power which the fuel cell stack 1 generates is supplied to the load 21 or a battery, not shown. The load 21 is mainly an electric motor for driving the vehicle. The voltage Vc of the fuel cell stack 1 is detected by a sensor 41, and the current Ic is detected by a sensor 42, respectively.

A controller 50 which controls the fuel cell system comprises one, two or more microprocessors, RAM, ROM, and an I/O interface. When the fuel cell stack 1 stops, the controller 50 breaks the connection between the load 21 and the fuel cell stack 1, selects a protection device (protection method) for protecting the fuel cell stack 1 from freezing of water, and operates this selected protection device so as to protect the fuel cell stack 1.

During running, in the fuel cell stack 1, fuel gas is supplied to an anode. The fuel gas is hydrogen supplied from a hydrogen storage device, or reformate gas containing hydrogen obtained by reforming a hydrocarbon fuel such as gasoline or methanol. Air is supplied to a cathode as gas containing oxygen. In the fuel cell stack 1, electrical energy is extracted using hydrogen and oxygen. When supply of these gases is stopped, the fuel cell stack 1 does not generate power.

Figure 2:
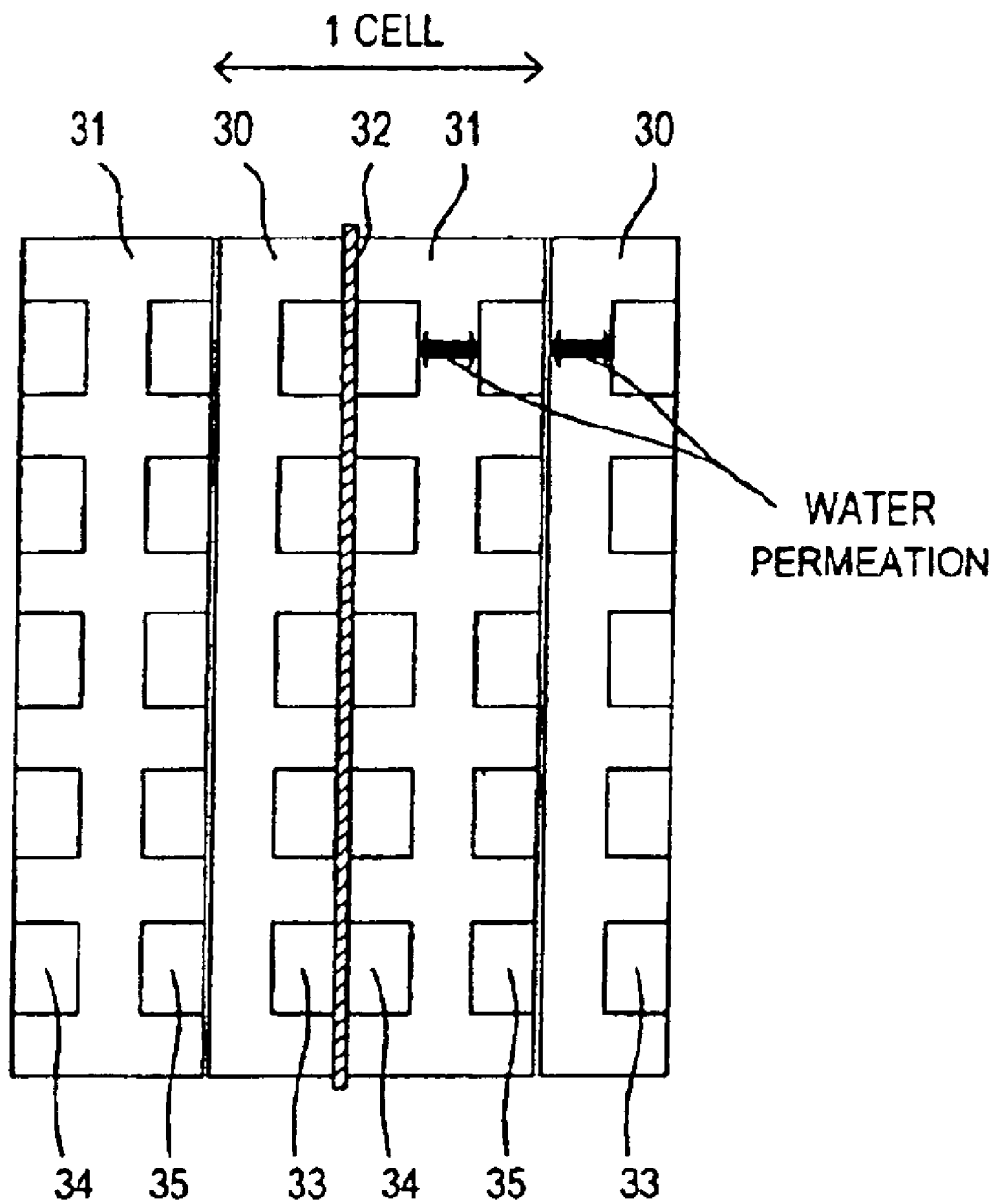
FIG. 2 is a diagram showing the internal structure of the fuel cell stack.

FIG. 2 shows the internal structure of the fuel cell stack 1. The fuel cell stack 1 comprises two or more cells which are laminated together. One cell comprises bipolar plates 30, 31, and a membrane electrode assembly 32 (hereafter, MEA) inserted between the bipolar plates 30, 31. Plural passages 33 which pass anode gas are formed between the plate 30 and MEA 32, and plural passages 34 which pass cathode gas are formed between the plate 31 and MEA 32. Moreover, plural passages 35 which supply pure water for cooling and humidification are formed between the cells.

A porous plate which passes liquids is used for the plates 30, 31. Thus, when pure water is passes into the passage 35, pure water permeates the plates 30, 31 and reaches the passages 33, 34, and the gas which flows through the passages 33, 34 is thereby humidified. Moreover, when the reaction generates excess water in the gas passages 33, 34, pure water permeates the plates 30, 31, and is collected in the passages 35.

Consequently, the gas which flows inside the fuel cell stack 1 is suitably humidified, and MEA 32 is prevented from drying. Moreover, as humidification and water recovery are performed in the fuel cell stack 1, a humidifier and water recovery device are unnecessary.

The cooling device of the fuel cell stack 1 comprises the pump 2, heat exchanger 3, inner water tank 4 and cooling water passage 6. The coolant is pure water. The heat which the fuel cell stack 1 generates during power generation is transmitted, via the heat exchanger 3, to an antifreeze solution flowing inside the heat exchanger 3 from the pure water, and is released to the outside air from a radiator, not shown. Pure water is used for cooling the fuel cell stack 1, so when the outside air temperature falls to freezing point and there is pure water in the fuel cell stack 1, the pure water is frozen and may cause failure of the fuel cell stack 1. Therefore, in this embodiment, there are two devices which protect the fuel cell stack 1 from the freezing of pure water.

The first protection device is a device which maintains the temperature of the fuel cell stack 1 higher than 0° C. by heating the fuel cell stack 1 and keeping it warm. The first protection device comprises the heat insulating case 10 which suppresses heat release to the outside air from the fuel cell stack 1 so that temperature drop of the fuel cell stack 1 is suppressed, and an inner heater 5 which heats the inside of the heat insulating case 10. The inner heater 5 is a combustor or catalytic combustor using the fuel of the fuel cell stack 1. The inner heater 5 may be an electric heater using power supplied from a battery or an external power supply.

The second protection device comprises the pump 11 which drains pure water in the inner water tank 4, the outer water tank 12 which reserves the drained pure water, and the outer heater 13 for thawing water frozen in the outer water tank 12. The outer water tank 12 has a structure which can withstand the expansion of pure water when it freezes. The outer heater 13 is a combustor or catalytic combustor using the fuel of the fuel cell stack 1. The outer heater 13 may be an electric heater using power supplied from a battery or an external power supply.

The second protection device drains the pure water in the inner water tank 4 to the outer water tank 12 when the fuel cell stops running so that pure water does not remain in the fuel cell stack 1, and thus prevents the pure water from freezing in the fuel cell stack 1. As the pure water in the outer water tank 12 is frozen when the fuel cell stack 1 has stopped, when the fuel cell stack 1 is restarted, it is necessary that the outer heater 13 thaws the frozen water, and that the thawed water is returned to the inner water tank 4 by the pump 11.

In this embodiment, the protection device which is activated to protect the fuel cell stack 1 when the fuel cell stack 1 has stopped is determined by the driver operating a protection device selector 51.

Figure 3:
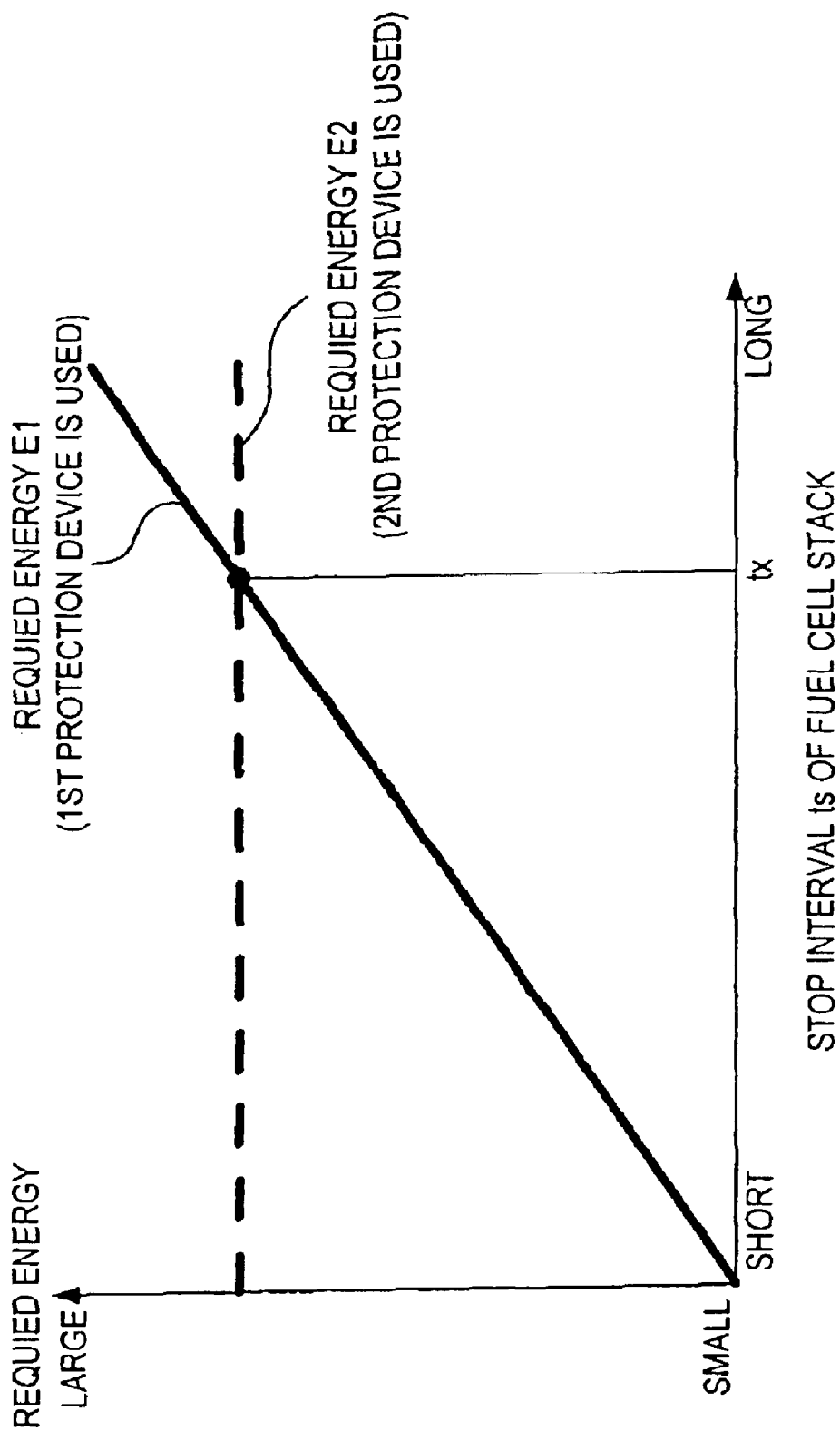
FIG. 3 is a diagram showing the relation between the stop interval of the fuel cell stack and the amount of energy required for protection of the fuel cell stack.

FIG. 3 shows the relation between the stop interval of the fuel cell stack 1 and the energy required to protect the fuel cell stack 1 from freezing of water.

An energy E1 required when using the first protection device is the energy required to compensate the heat release amount from the fuel cell stack 1 to the outside air by heating with the inner heater 5, and to keep the fuel cell stack 1 higher than 0° C. In FIG. 3, an elapsed time after the temperature of the fuel cell stack 1 drops to near 0° C. is taken as the stop interval of the fuel cell stack 1. When the first protection device is used, if the heater is operated under a fixed load, the heat release amount of the fuel cell stack 1 increases the longer the stop interval ts of the fuel cell stack 1 becomes, and the required energy increases in proportion to the stop interval ts of the fuel cell stack 1, as shown in the figure.

On the other hand, an energy E2 required when using the second protection device is the sum of the energy required to drain pure water from the inner water tank 4 to the outer water tank 12 (energy consumption of the pump 11), the energy required to thaw the pure water frozen in the outer water tank 12 at the time of re-starting (energy consumption of the outer heater 13), and the energy required to return pure water from the outer water tank 12 to the inner water tank 4 (energy consumption of the pump 11). Therefore, the energy E2 required when using the second protection device, if the outside air temperature at the time of re-starting is not taken into consideration, is not based on the stop interval ts of the fuel cell stack 1, but is fixed, as the broken line in the figure shows.

Therefore, the required energy of both devices becomes equal at a certain stop interval tx. If the first protection device is used when the stop interval ts of the fuel cell stack 1 is shorter than tx, and the second protection device is used when it is longer than tx, the energy required for protection of the fuel cell stack 1 can be reduced.

In this embodiment, the driver determines which protection device to use by the protection device selector 51. As the driver can predict the stop interval of the vehicle, i.e., the stop interval ts of the fuel cell stack 1, from how the vehicle is to be used on the next occasion, the driver selects a suitable protection device based thereon. In order to suppress the energy consumption low, the driver selects the first protection device when the stop interval is short, and selects the second protection device when the stop interval is long.

Figure 4:
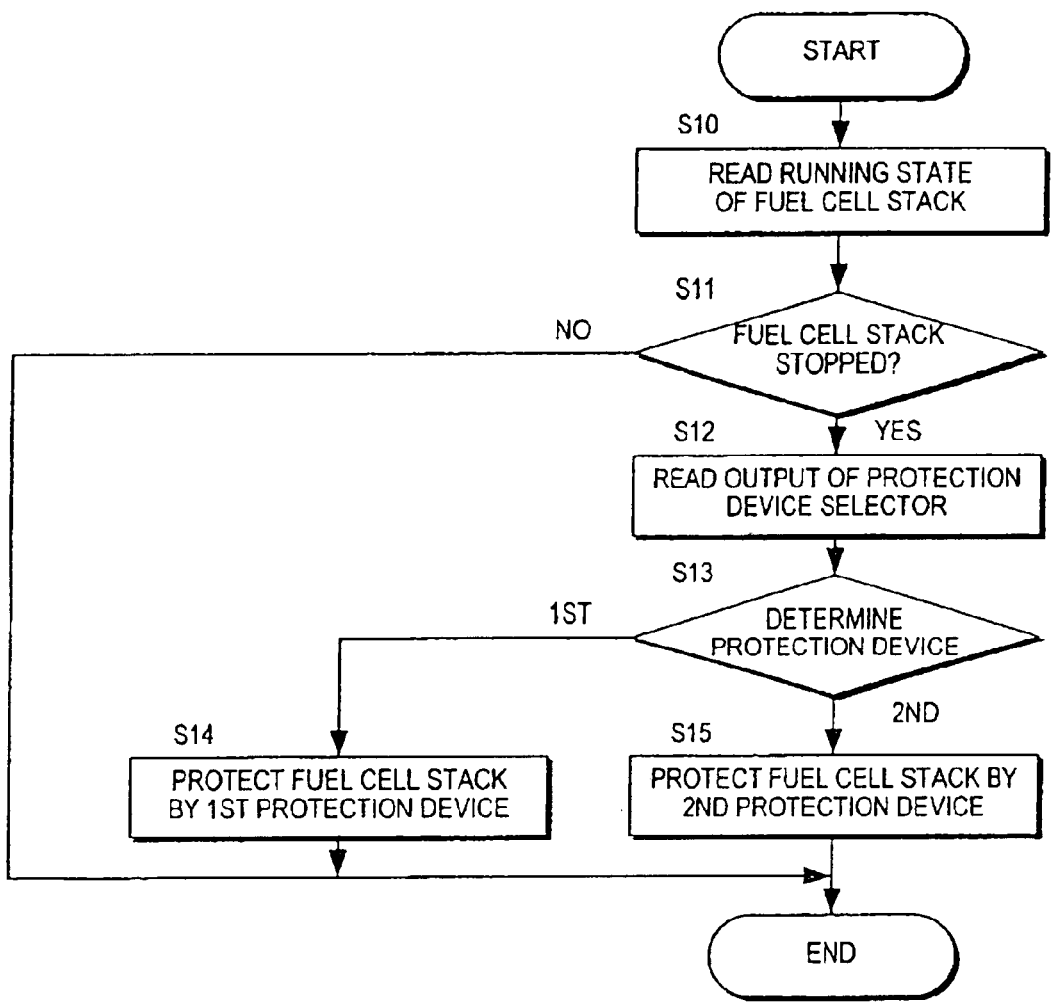
FIG. 4 is a flowchart showing protection device selection processing.

FIG. 4 is a flowchart showing protection device selection processing, and is repeatedly performed by the controller 50 at a predetermined interval.

First, in a step S10, the running state, such as the voltage Vc and the current Ic of the fuel cell stack 1, are read, and in a step S11, it is determined based on the running state whether the fuel cell stack 1 has stopped. This invention has the object of preventing freezing when the temperature of the fuel cell falls. As a certain amount of time will elapse until the temperature of the fuel cell falls, protection is assumed to be required when the fuel cell does not generate power for a long time. Therefore, stop of the fuel cell stack 1 is not assumed to be a transient stop during running, or a stop during idle running, but a stop when the driver leaves the vehicle and the vehicle is not driven for a certain period. Further, as the temperature of the fuel cell stack 1 begins to fall from when the fuel cell stack 1 stops generating power, it is preferable to determine that the fuel cell stack 1 has stopped running when the fuel cell stack 1 stops generating power, i.e., when the voltage Vc or current Ic of the fuel cell stack 1 become zero.

When it is determined that the fuel cell stack 1 has stopped, the routine proceeds to a step S12 and the output of the protection device selector 51 is read.

In a step S13, it is determined which protection device is to be selected based on the output of the protection device selector 51. When the first protection device is selected, the routine proceeds to a step S14, and the fuel cell stack 1 is protected by the first protection device, i.e., the fuel cell stack 1 is kept warm by the heat insulating case 10, and heated by the inner heater 5.

On the other hand, when the second protection device is selected, the routine proceeds to a step S15, and the fuel cell stack 1 is protected by the second protection device, i.e., the pure water in the inner water tank 4 is drained to the outer water tank 12 by the pump 11, and the freezing of the pure water in the fuel cell stack 1 is prevented. In this case, as the water freezes in the outer water tank 12, it is necessary to thaw the frozen water using the outer heater 13 at the time of re-starting, and to return the water to the inner water tank 4 by the pump 11.

Figure 5:
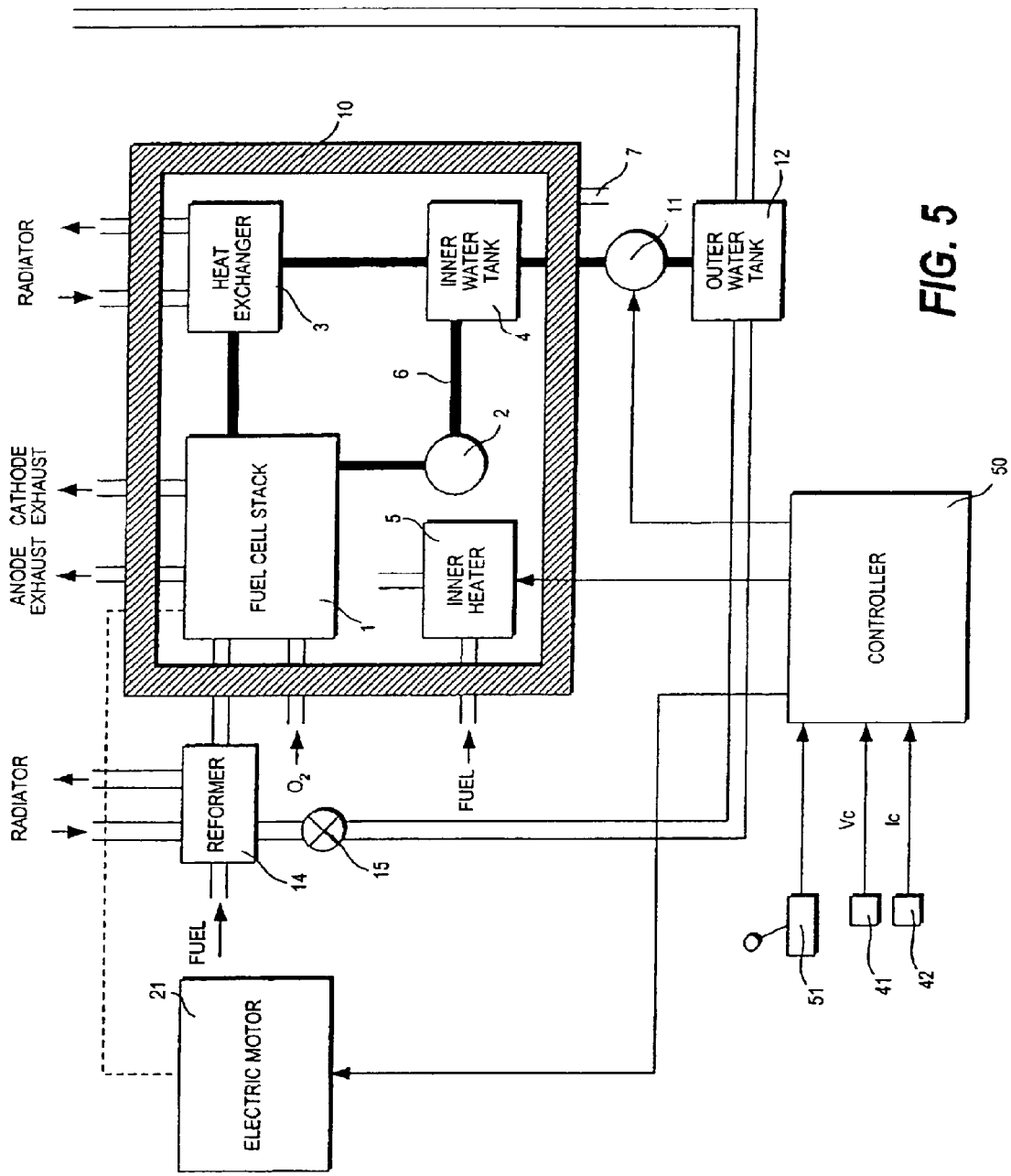
FIG. 5 is a diagram showing a variation of the first embodiment.

In this embodiment, the pure water frozen in the outer water tank 12 is thawed by the outer heater 13, but when the fuel cell stack 1 is provided with a reformer 14 for reforming fuel to the reformate gas as shown in FIG. 5, a coolant which cools the reformer 14 may be led to the outer water tank 12 by opening a valve 15, the heat generated on re-starting used to warm the coolant, and the frozen water thawed by the warmed coolant.

Figure 6:
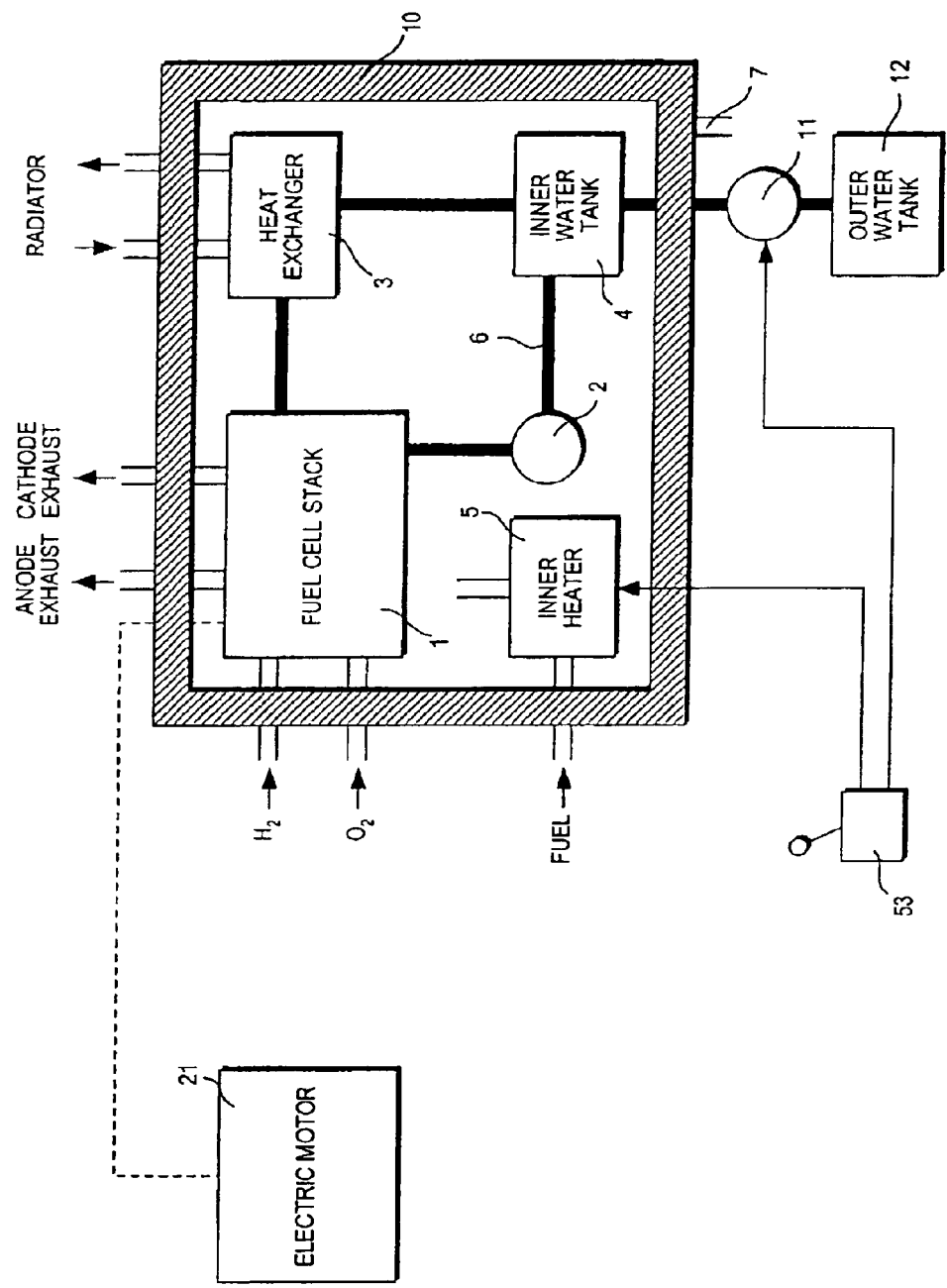
FIG. 6 is a diagram showing a variation of the first embodiment.

Further, as shown in FIG. 6, the controller 50 may be omitted, and an operator (driver) may directly select whether to use the first protection device or second protection device to protect the fuel cell stack 1 when it has stopped, by operating a manually operable selector 53. The selector 53 can select three states, i.e., the state when the first protection device operates, the state when the second protection device operates and the state when none of the protection devices operate. The selector 53 may comprise a switch which changes over between operation/non-operation of the inner heater 5 and a switch which changes over between operation/non-operation of the pump 11.

In this case, when the fuel cell stack 1 has stopped for a short time, the operator operates the selector 53 to operate the inner heater 5, the fuel cell stack 1 is heated by the inner heater 5, and freezing of water in the fuel cell stack 1 is prevented. On the other hand, when the fuel cell stack 1 has stopped for a long time, the operator operates the selector 53 to operate the pump 11, and prevents freezing of water in the fuel cell stack 1 by draining pure water in the inner water tank 4 to the outer water tank 12.

Next, a second embodiment will be described.

Figure 7:
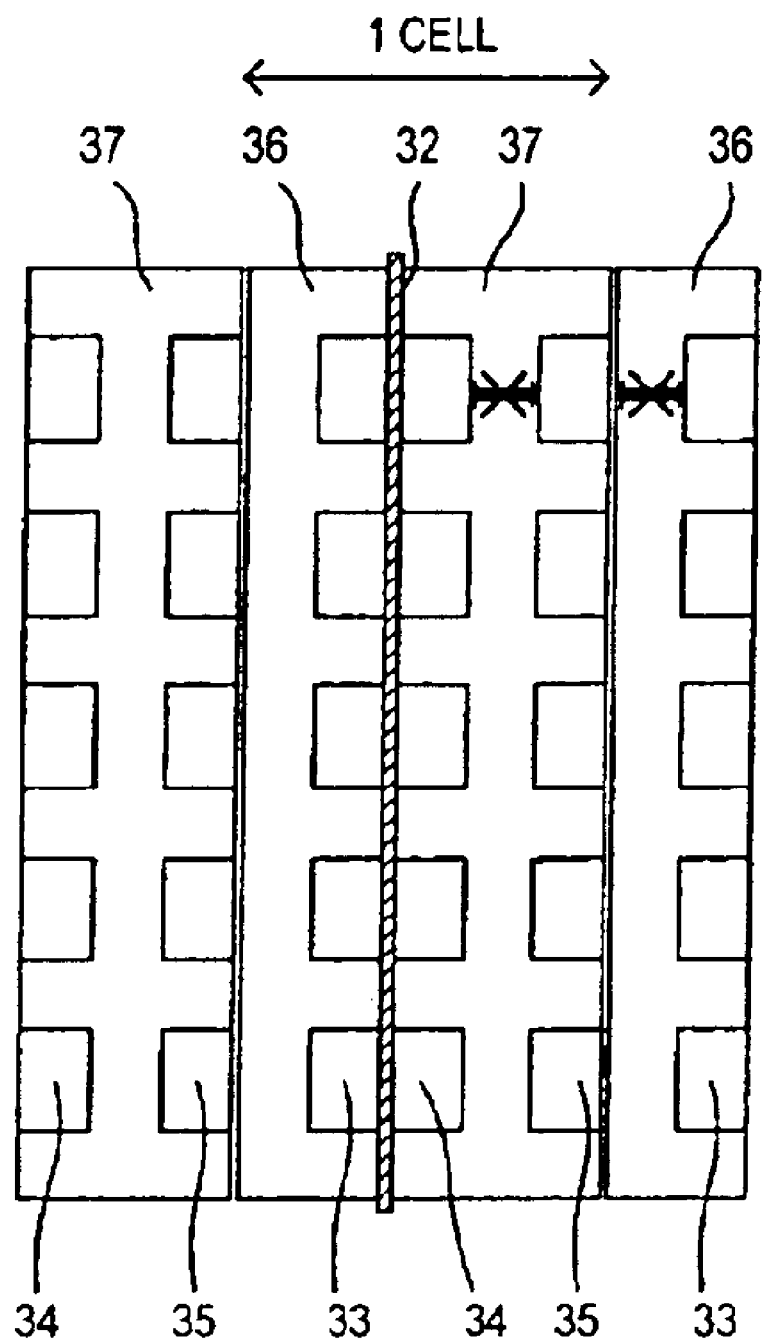
FIG. 7 shows another example of the internal structure of the fuel cell stack.

In the first embodiment, humidification of gas and recovery of water from the gas were performed in the fuel cell stack 1 by using the porous bipolar plates 30, 31, but in the second embodiment, plates 36, 37 which do not pass liquid through are used as the bipolar plates of the fuel cell stack 1 as shown in FIG. 7, and a humidifier 16 which humidifies the gas supplied to the fuel cell stack 1, and a water recovery device 17 which recovers water from the gas which has flowed out from the fuel cell stack 1, are provided.

Figure 8:
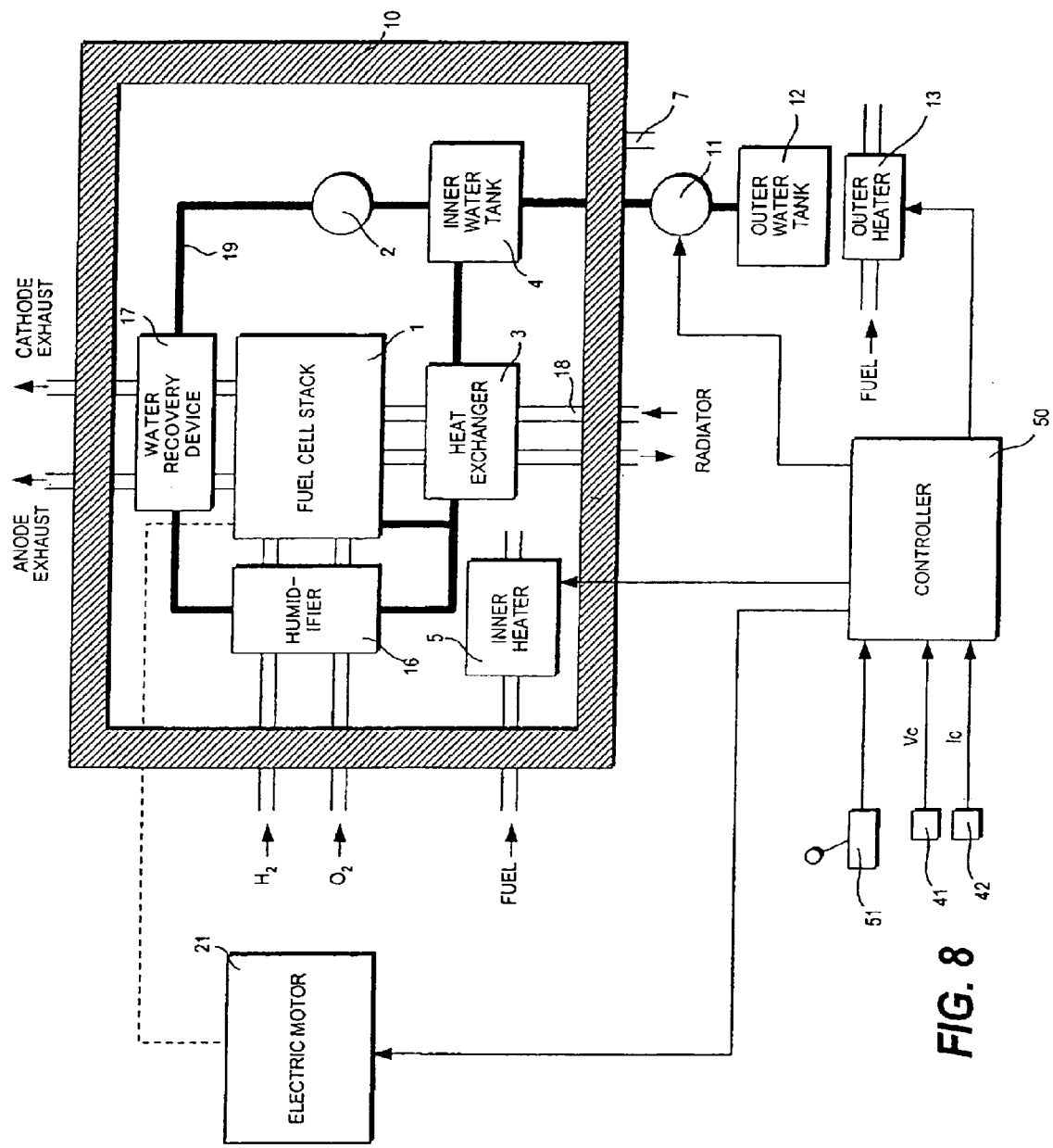
FIG. 8 shows a second embodiment of this invention.

FIG. 8 shows the second embodiment. The humidifier 16 is provided upstream of the fuel cell stack 1, and the water recovery device 17 is provided downstream of the fuel cell stack 1. Pure water used as coolant flows through the humidifier 16 and water recovery device 17.

A cooling water passage 18 of the fuel cell stack 1 which circulates antifreeze solution, and a pure water passage 19 which circulates pure water used for humidification, are separated. The cooling water passage 18 is used for temperature control of the fuel cell stack 1, and the pure water passage 19 is used to supply pure water to the humidifier 16, and recover water from the fuel cell stack 1 and water recovery device 17. The humidifier 16 and water recovery device 17 are installed inside the heat insulating case 10.

The selection of the protection device in this embodiment is identical to that of the first embodiment shown in FIG. 4, and when the fuel cell stack 1 has stopped, the fuel cell stack 1 is protected using the protection device selected by the protection device selector 51.

Next, a third embodiment will be described.

The construction of the third embodiment is substantially identical to that of the first embodiment. In the third embodiment, the selection of the protection device is performed when the temperature of the fuel cell stack 1 falls below a predetermined temperature. Specifically, protection by the protection device is not performed until the temperature of the fuel cell stack 1 falls below the predetermined temperature. Further, the selection of the protection device is performed based on the stop interval of the fuel cell stack 1.

Figure 9:
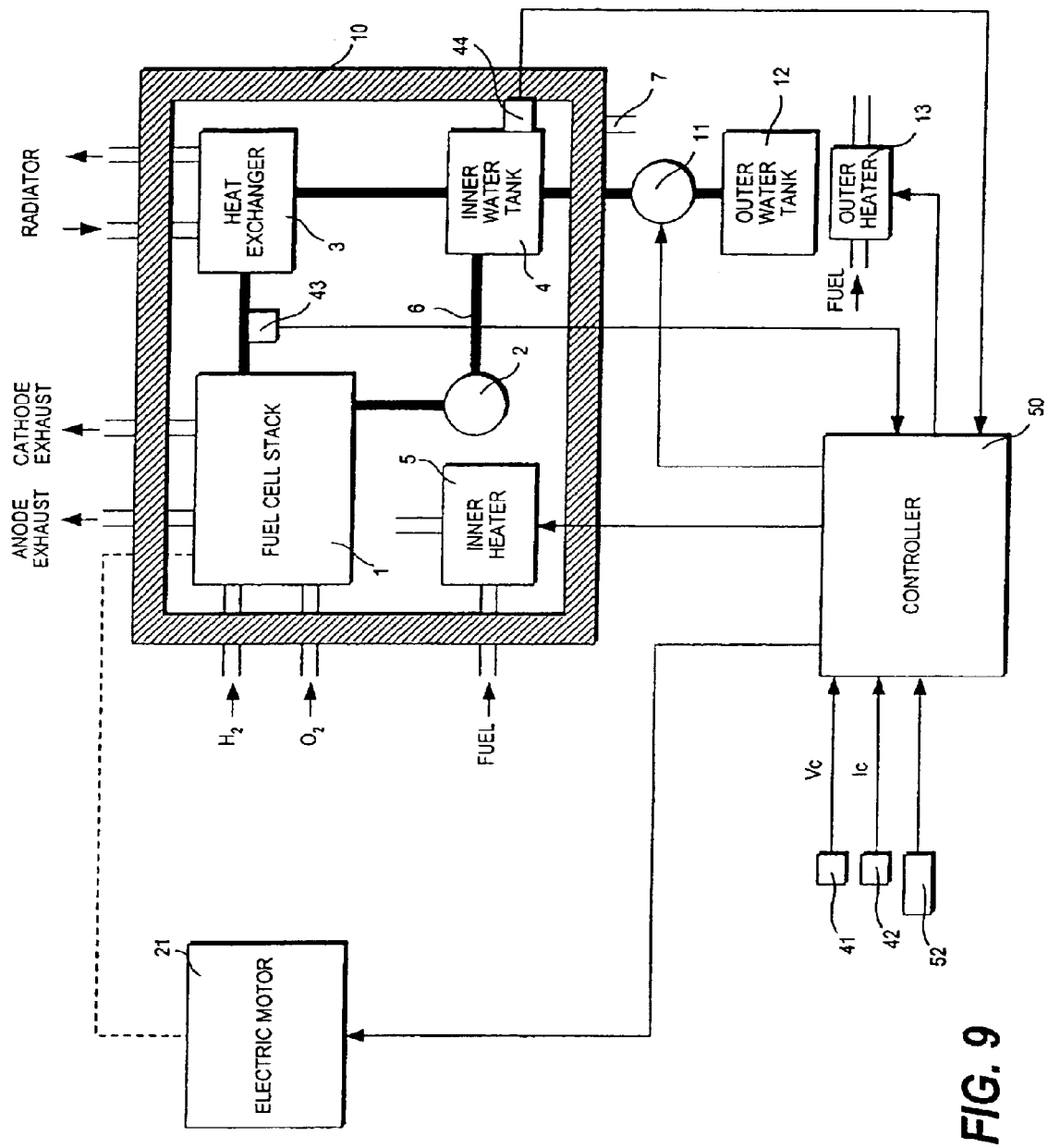
FIG. 9 shows a third embodiment of this invention.

FIG. 9 shows the construction of the third embodiment. A sensor 43 which detects the temperature of the pure water flowing through the cooling water passage 6, a sensor 44 which detects the water amount in the inner water tank 4 and an input device 52 are added to the construction of the first embodiment shown in FIG. 1.

Figure 10:
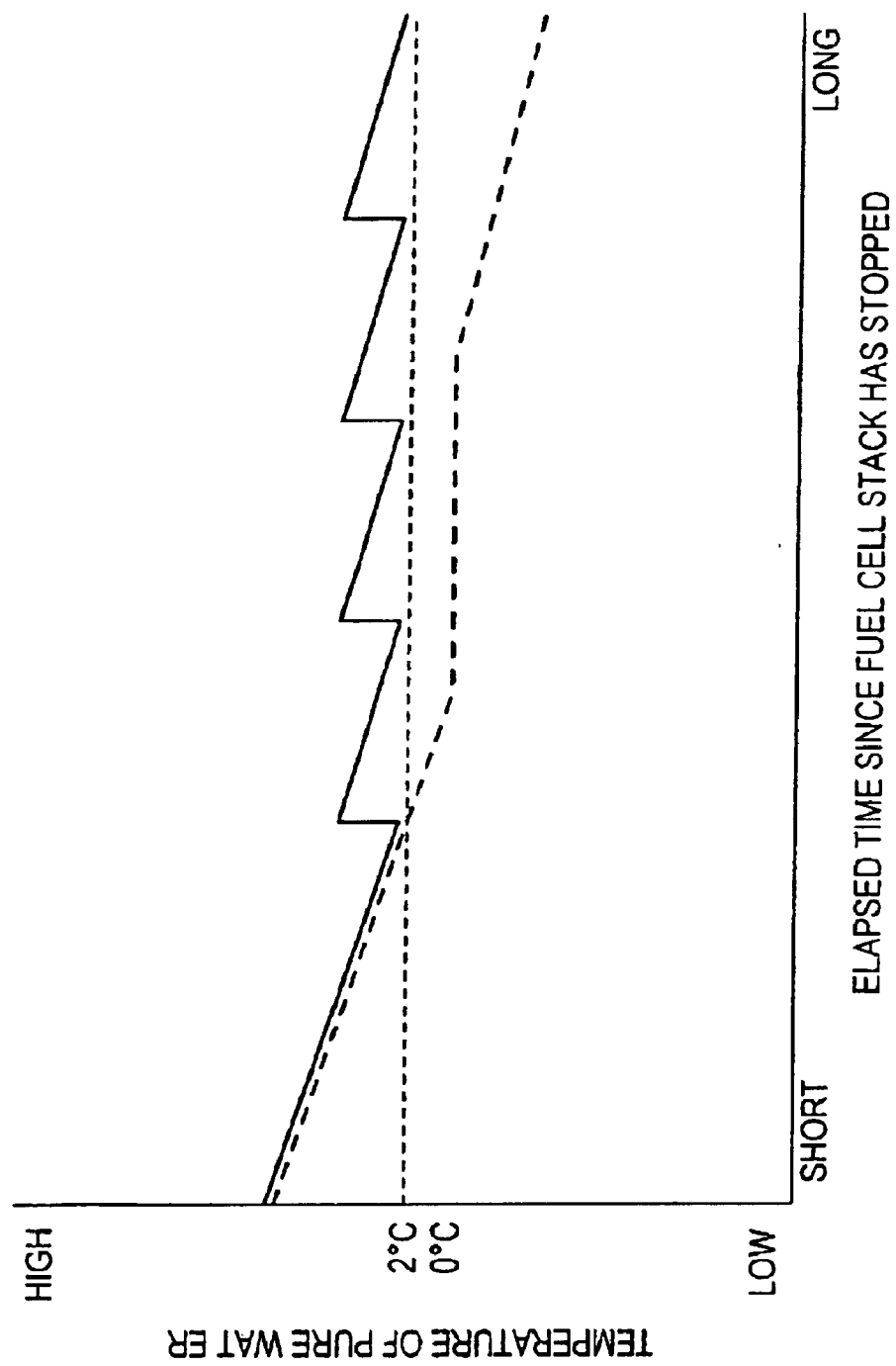
FIG. 10 is a time chart showing a variation of water temperature after the fuel cell stack stops.

The broken line in FIG. 10 shows the temperature variation of the pure water after the fuel cell stack 1 has stopped. Immediately after the fuel cell stack 1 has stopped, the temperature of the fuel cell stack 1 is the rung temperature, for example, approximately 80° C., so some time is required for the temperature of the fuel cell stack 1 to fall below 0° C. As there is no need for protection by the protection device if the temperature of the fuel cell stack 1 does not fall below 0° C., in this embodiment, it is determined whether to use one of the protection devices after the temperature of the fuel cell stack 1 has approached 0° C.

The temperature of the pure water flowing through the cooling water passage 6 is used as a temperature TEMPc of the fuel cell stack 1. This is in view of the fact that the fuel cell stack 1 is damaged when the pure water in the fuel cell stack 1 freezes.

In FIG. 10, the broken line shows the temperature variation when the protection devices are not operated, and the solid line shows the temperature variation of the fuel cell stack 1 when the fuel cell stack 1 is protected by the first protection device. When the temperature of the fuel cell stack 1 has dropped to near 0° C., the inner heater 5 is operated to maintain the temperature of the pure water above freezing point (0° C.). The freezing point of pure water is 0° C., and in theory, freezing of the pure water can be prevented by operating inner heater 5 when the temperature of the fuel cell stack 1 (temperature of the pure water) is 0° C., but as there is unevenness in the temperature of the pure water due to the detection position and a detection error in the sensor 43, the heater is operated when, for example, the temperature of the fuel cell stack 1 is 2° C.

In this embodiment, the inner heater 5 increases the temperature of the pure water by warming the air in the heat insulating case 10, but in this embodiment or the other embodiments, the inner heater 5 may heat the pure water directly by heating the pure water passage. Alternatively, an antifreeze solution passage may be provided in contact with the pure water passage, and the temperature of the pure water increased by warming the antifreeze solution flowing through the passage.

Figure 11:
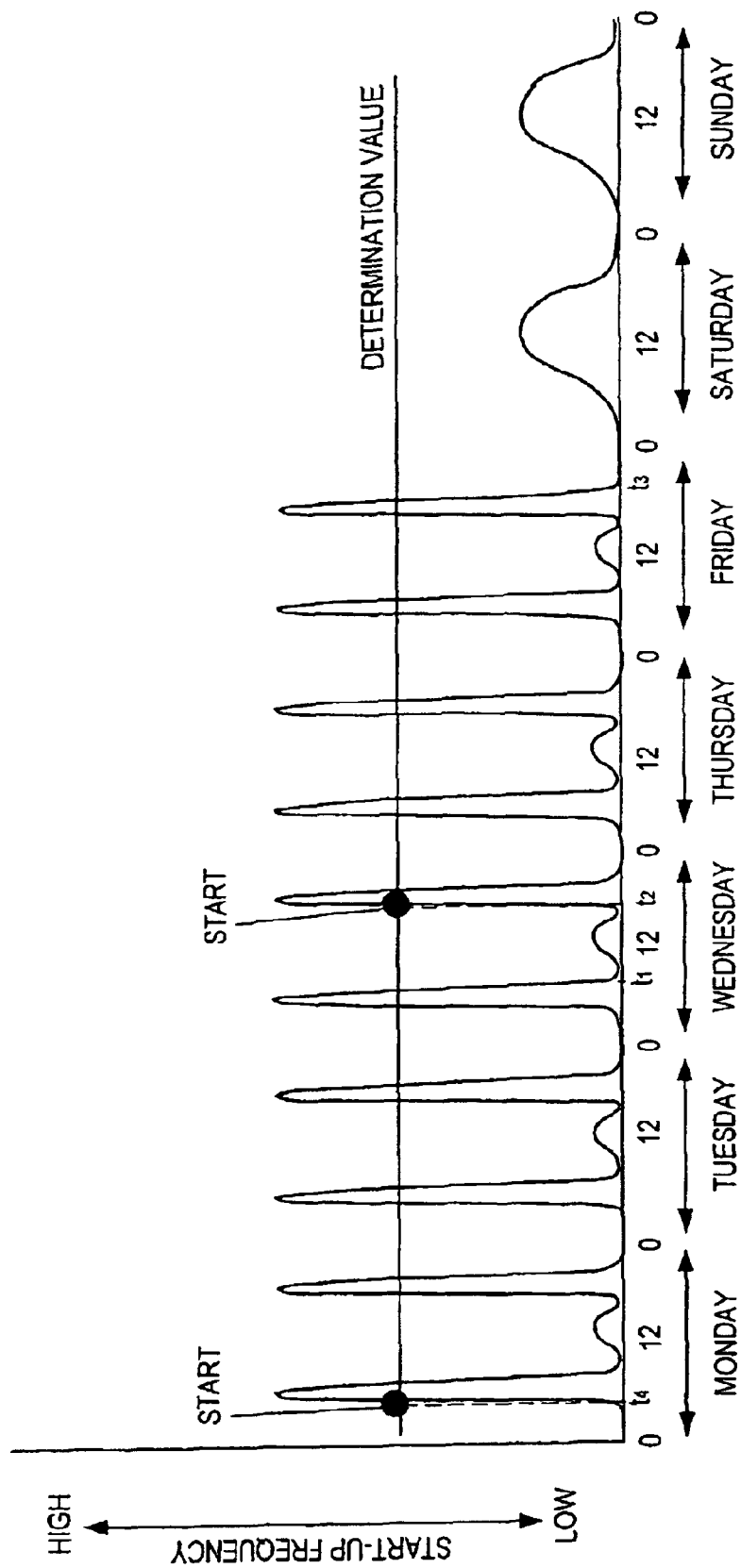
FIG. 11 is a frequency distribution map of the starting time of the fuel cell stack.

Next, the method of predicting the stop interval of the fuel cell stack 1 will be described. In FIG. 11, the relation between day of the week, time and start-up frequency of the fuel cell stack 1 is shown. FIG. 11 shows the frequency distribution when the vehicle is mainly used for traveling to work, and in this case, the start-up frequency in the morning and evening is higher. If the start-up frequency is learned and stored in the memory of the controller 50, the next start-up time can be predicted from the stop time, so the stop interval of the fuel cell stack 1 may be predicted.

For example, if the time at which the start-up frequency first exceeds a predetermined determination value after the stop time, is assumed to be the next start-up time, when the vehicle stopped at a time t1 in FIG. 11, it is determined that the fuel cell stack 1 is restarted at a time t2 on Wednesday after the time t1 when the start-up frequency first exceeds the determination value. Likewise, when the vehicle stops at a time t3 on Friday, it is determined that a time t4 on Monday is the next start-up. If the next start-up time can be predicted, the stop interval of the fuel cell stack 1 can be predicted from the stop time.

Figure 12:
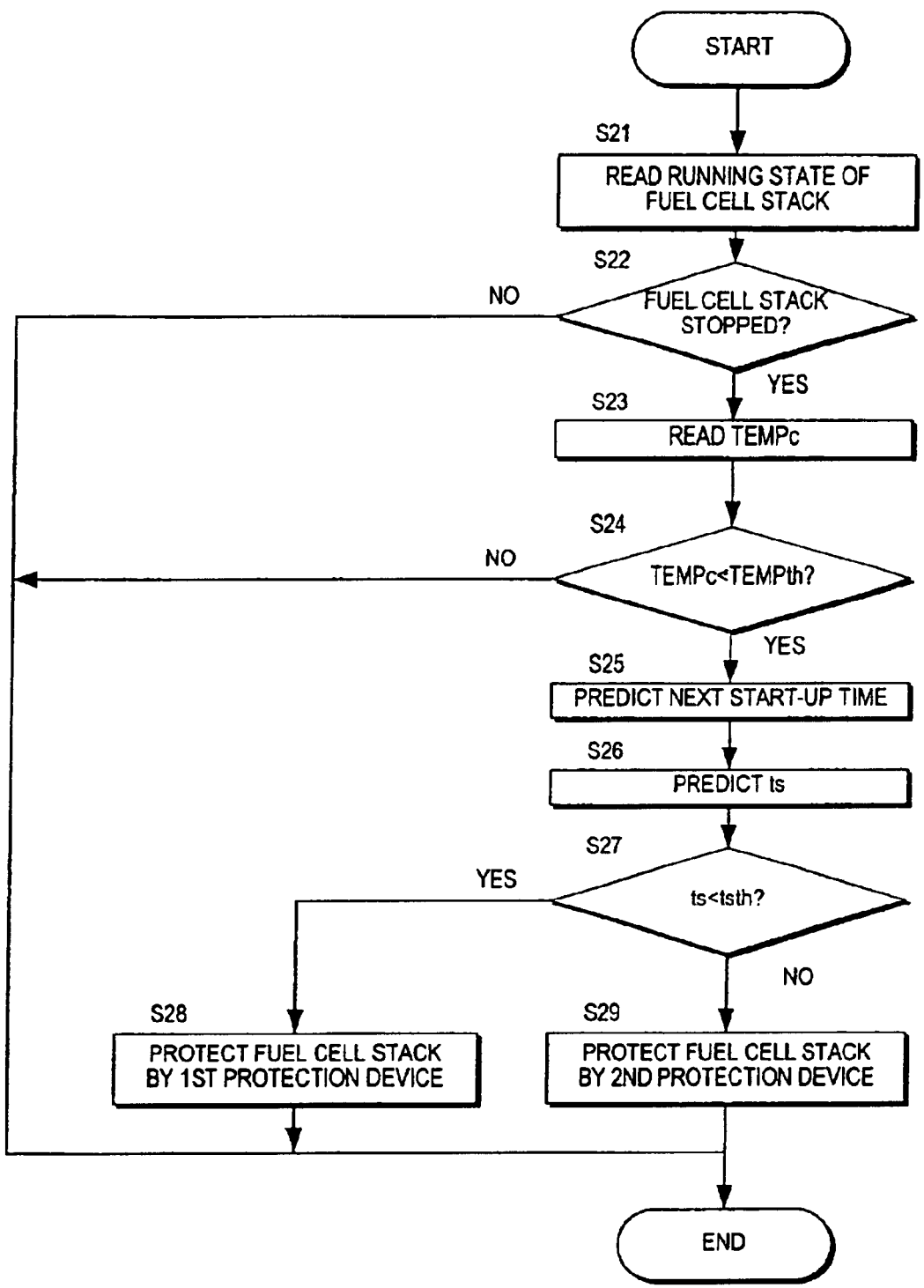
FIG. 12 is a flowchart of protection device selection processing according to the third embodiment.

FIG. 12 shows a flowchart of protection device selection processing in the third embodiment, and is performed at a predetermined interval in the controller 50.

According to this, in a step S21, the running state such as voltage Vc and current Ic of the fuel cell stack 1 are read, and in a step S22, it is determined whether or not the fuel cell stack 1 has stopped based on the running state.

When it is determined that the fuel cell stack 1 has stopped, the routine proceeds to a step S23, and the temperature TEMPc of the fuel cell stack 1 is read. In a step S24, it is determined whether or not the temperature TEMPc of the fuel cell stack 1 is lower than a predetermined temperature TEMPth, for example, 2° C., and if it is lower than the predetermined temperature TEMPth, the routine proceeds to a step S25.

In the step S25, the next start-up time is predicted by the above method. In a step S26, the stop interval ts of the fuel cell stack 1 is predicted from the stop time and the predicted start-up time of the fuel cell stack 1. The stop interval of the fuel cell stack 1 may be input by the driver from the input device 52, and this input stop interval may be used instead of the above predicted stop interval.

In a step S27, the protection device is selected based on the stop interval ts. When it is determined that the stop interval is shorter than a threshold value tsth, for example 24 hours, protection is given by the first protection device in a step S28. In other cases, the routine proceeds to a step S29 and protection is given by the second protection device.

Figure 13:
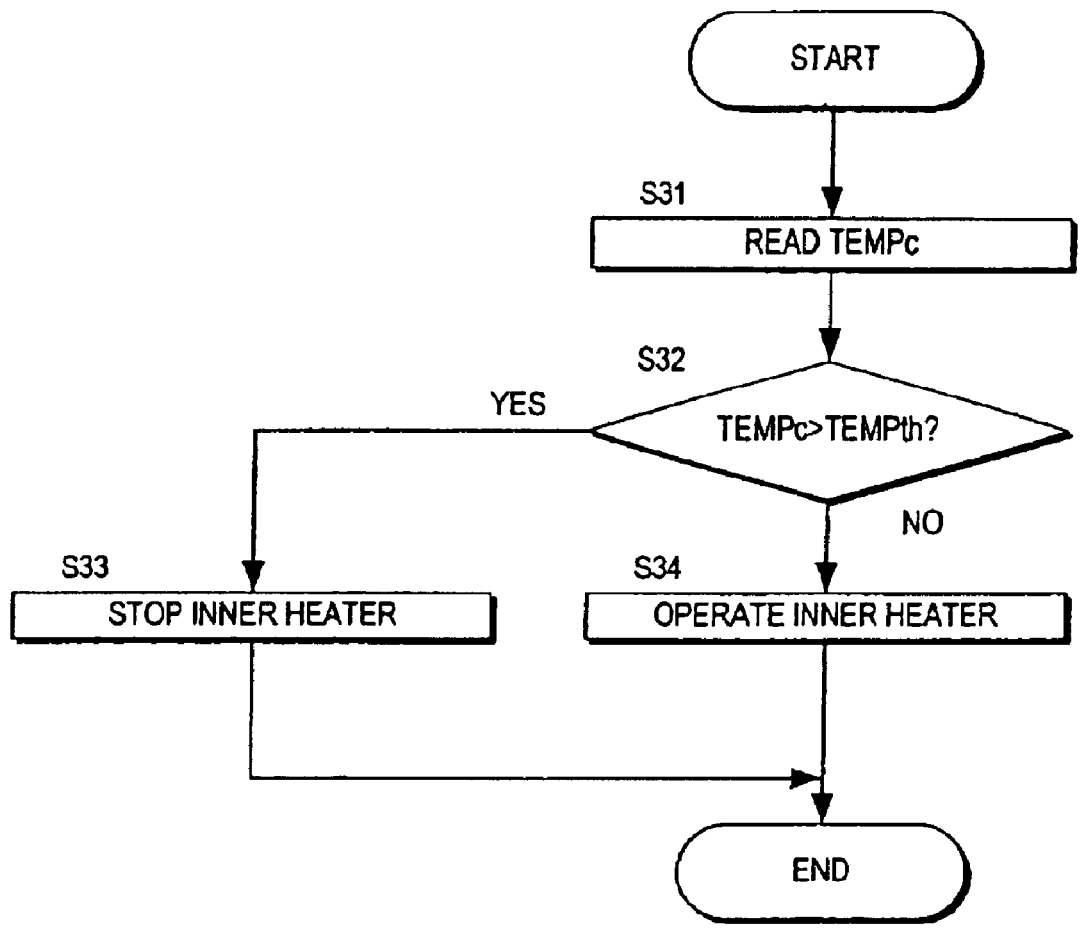
FIG. 13 is a flowchart of protection processing when the first protection device is selected.

FIG. 13 shows the processing when the first protection device is selected, and is performed repeatedly at a predetermined interval in the controller 50.

In a step S31, the temperature TEMPc of the fuel cell stack 1 is read.

In a step S32, it is determined whether the temperature TEMPc of the fuel cell stack 1 is higher than the predetermined temperature TEMPth, for example, 2° C. When it is higher than the predetermined temperature TEMPth, the routine proceeds to a step S33 and the inner heater 5 is stopped. When it is lower than the predetermined temperature TEMPth, the routine proceeds to a step S34 and the inner heater 5 is operated.

Figure 14:
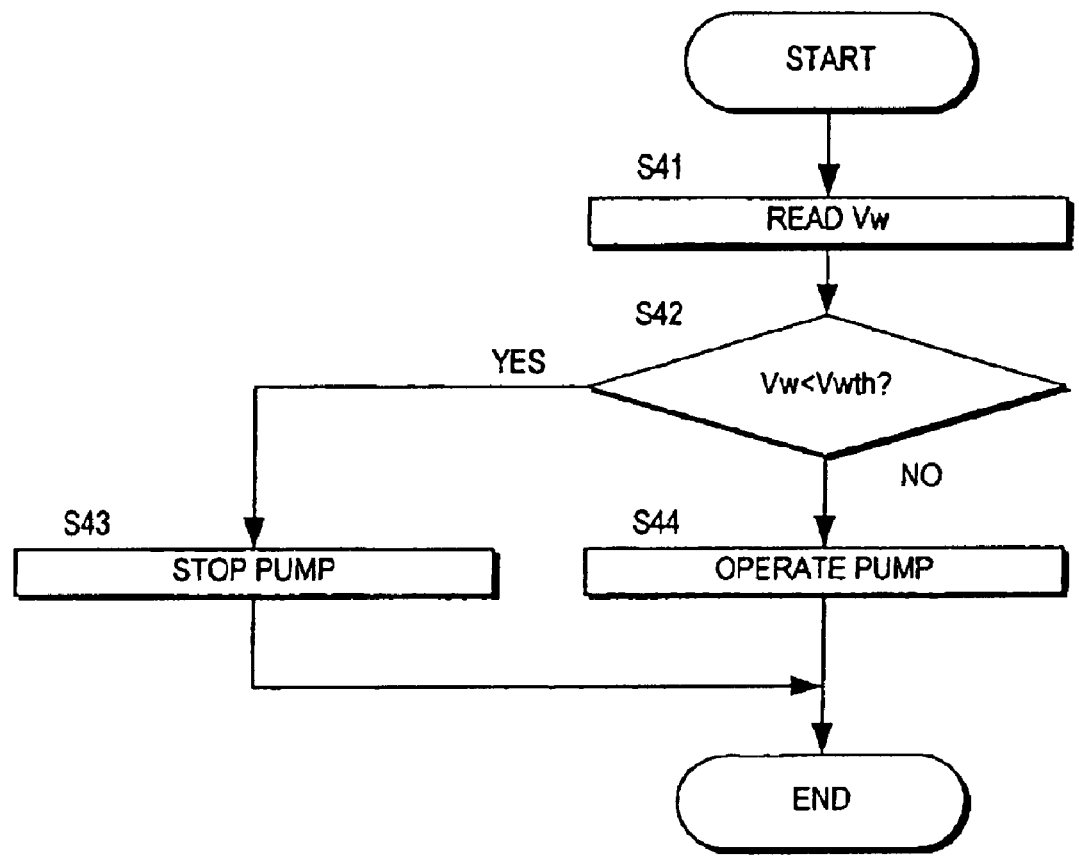
FIG. 14 is a flowchart of protection processing when the second protection device is selected.

FIG. 14 shows the processing when the second protection device is selected, and is performed repeatedly at a predetermined interval in the controller 50.

In a step S41, an amount Vw of pure water in the inner water tank 4 is read.

In a step S42, it is determined whether drain of water is complete.

Specifically, it is determined that drain of water is complete when the amount Vw of pure water in the inner water tank 4 is less than a predetermined amount Vwth. The predetermined amount Vwth is set lower than an amount at which the inner water tank 4 is not damaged even if the remaining pure water freezes and the frozen ice does not interfere with restarting, for example, 0.5 L.

When it is determined that drain of water is complete, the routine proceeds to a step S43 and the pump 11 is stopped. When drain of water is not complete, the routine proceeds to a step S44 and the pump 11 is operated.

When the fuel cell stack 1 is protected by the second protection device, the pure water freezes in the outer water tank 12, so the pure water which has frozen in the outer water tank 12 must be thawed by the outer heater 13, and the pure water must be returned to the inner water tank 4 by the pump 11.

The third embodiment was described as being substantially identical to the first embodiment, but may be applied also to a construction which is substantially identical to the second embodiment. The same is true in the case of the following embodiments, and the invention disclosed in the third and subsequent embodiments may also be applied to the constructions of the first embodiment and second embodiment.

Next, a fourth embodiment will be described. The construction of the fourth embodiment is substantially identical to that of the third embodiment.

In the fourth embodiment, an outside air temperature TEMPo is detected, and the effect of the outside air temperature TEMPo on the energy required to protect the fuel cell stack 1 is considered when a protection device is selected. By considering the effect of the outside air temperature TEMPo when the protection device is selected, a suitable protection device can be selected.

Figure 15:
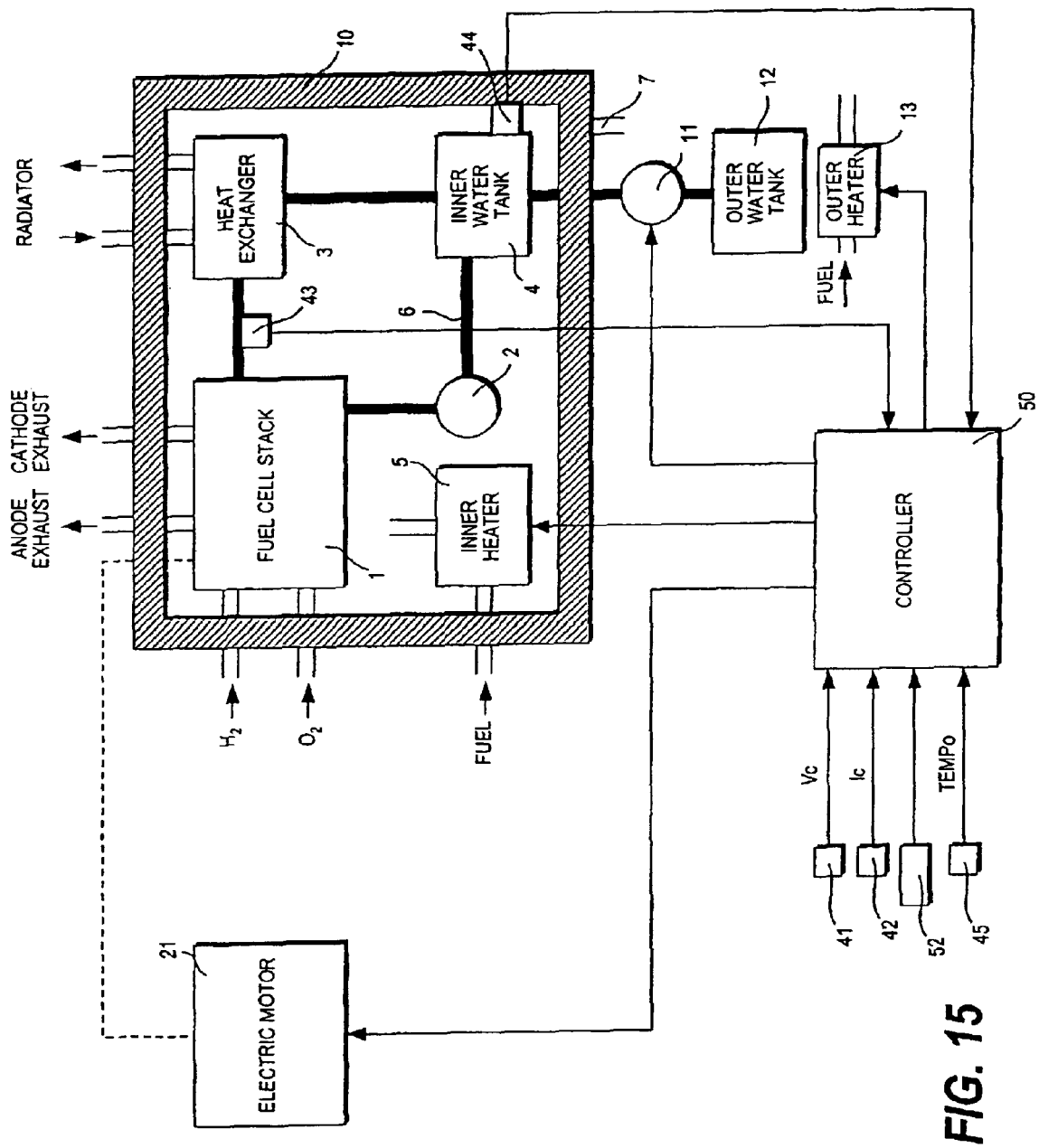
FIG. 15 shows a fourth and fifth embodiment of this invention.

FIG. 15 is a diagram of the construction of the fourth embodiment. Here, a sensor 45 which detects the outside air temperature TEMPo is added to the construction of the third embodiment.

Figure 16:
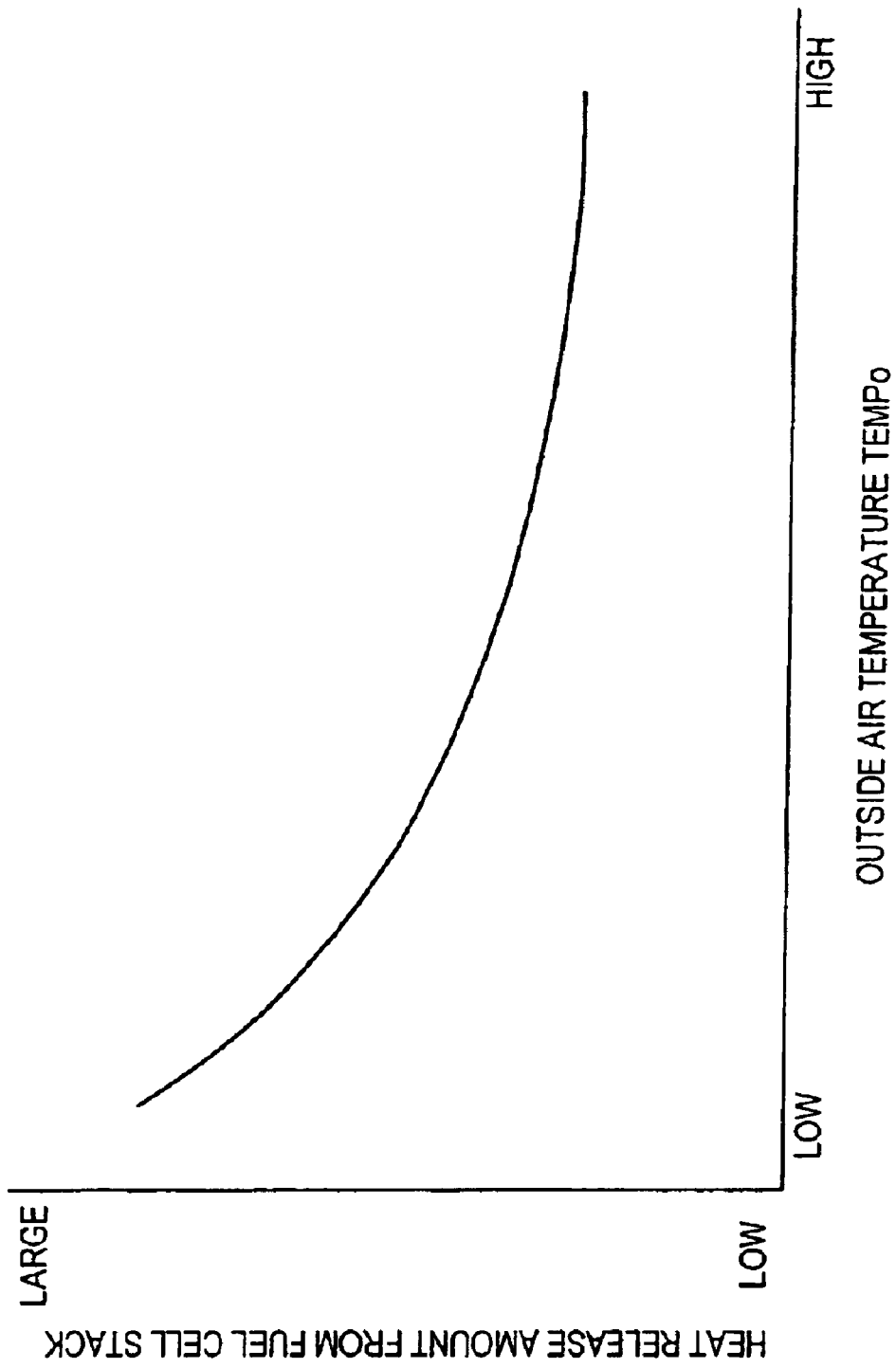
FIG. 16 shows the relation between outside air temperature and the heat release amount from the fuel cell stack.
Figure 17:
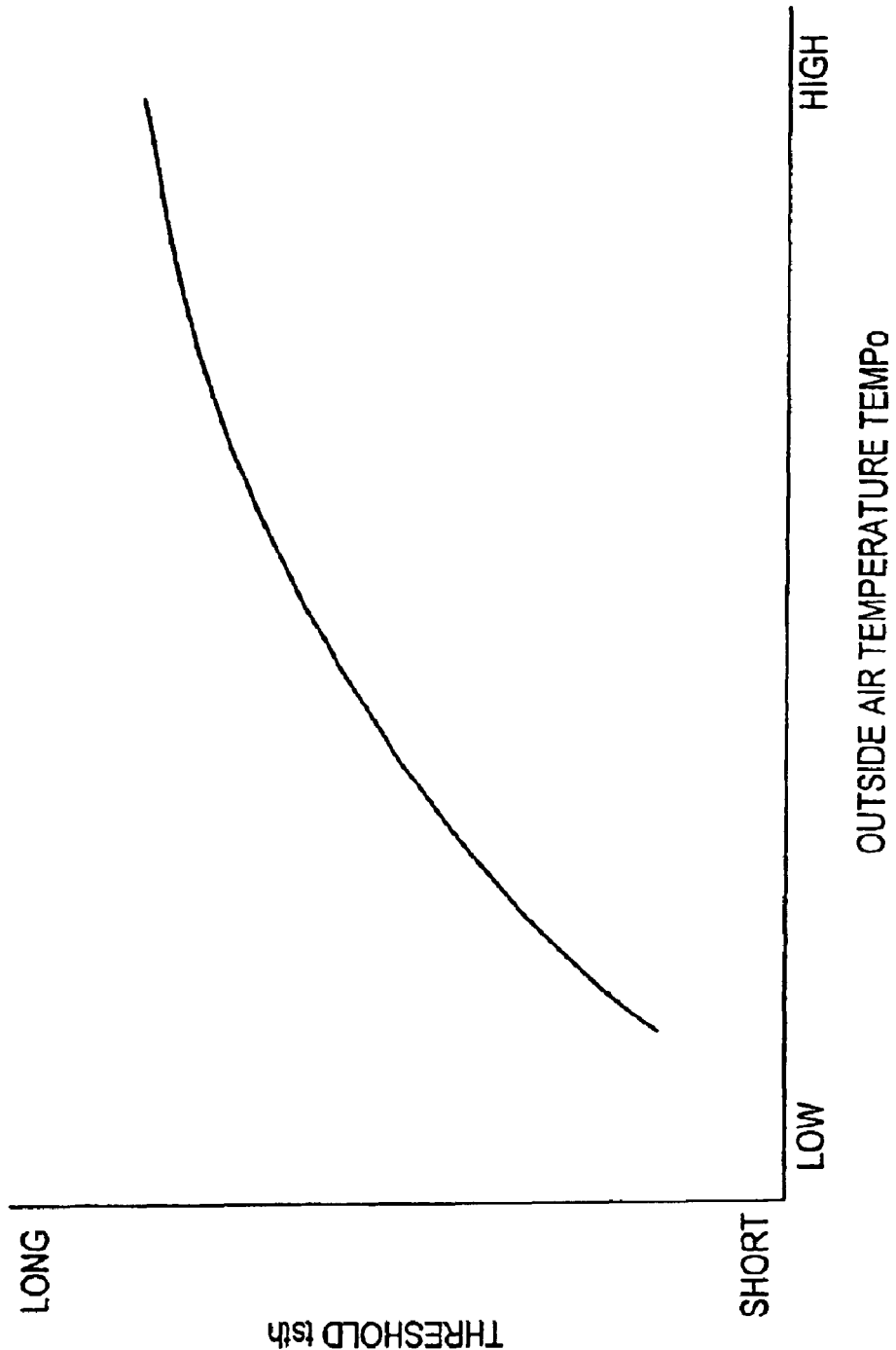
FIG. 17 shows the relation between outside air temperature and a threshold used for protection device selection.

FIG. 16 shows the relation between the outside air temperature TEMPo and the amount of heat released from the fuel cell stack 1 when the temperature of the fuel cell is constant. The amount of heat released from the fuel cell stack 1 increases and an energy E1 required when the first protection device is used increases, the lower the outside air temperature TEMPo becomes. Therefore, when the question of which protection device to use is determined according to the stop interval ts of the fuel cell stack 1, to select the protection device for which the energy required to protect the fuel cell stack 1 is lower, the threshold tsth must be made shorter the lower the outside air temperature TEMPo becomes as shown in FIG. 17.

Figure 18:
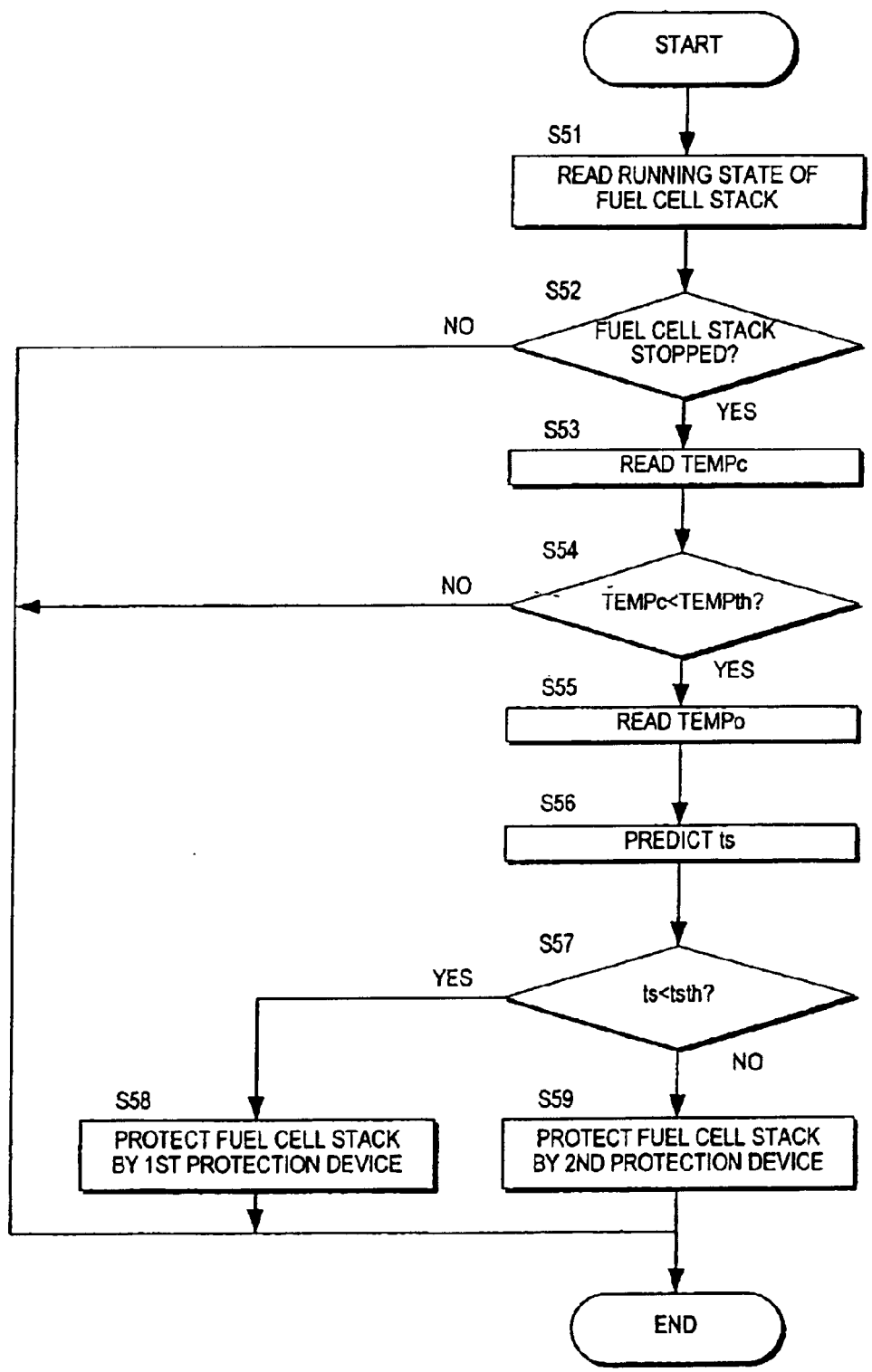
FIG. 18 is a flowchart of protection device selection processing according to the fourth embodiment.

FIG. 18 shows the protection device selection processing in the fourth embodiment, and this is repeatedly performed at a predetermined interval in the controller 50.

According to this, in a step S51, the running state such as the voltage Vc and current Ic of the fuel cell stack 1 is read, and in a step S52, it is determined whether or not the fuel cell stack 1 has stopped based on the running state.

When it is determined that the fuel cell stack 1 has stopped, the routine proceeds to a step S53, and the temperature TEMPc of the fuel cell stack 1 is read. In a step S54, it is determined whether the temperature TEMPc of the fuel cell stack 1 is lower than the predetermined temperature TEMPth, for example, 2° C. When it is determined that the temperature TEMPc of the fuel cell stack 1 is lower than the predetermined temperature TEMPth, the routine proceeds to a step S55, and the outside air temperature TEMPo is read. In a step S56, the stop interval ts of the fuel cell stack 1 is predicted. The method of predicting the stop interval ts is identical to that of the third embodiment, alternatively the driver can input the stop interval ts.

In a step S57, it is determined whether the stop interval ts of the fuel cell stack 1 is shorter than the threshold value tsth set according to the outside air temperature TEMPo. When it is shorter than the threshold value tsth, the routine proceeds to a step S58, and the fuel cell stack 1 is protected by the first protection device. In other cases, the routine proceeds to a step S59, and the fuel cell stack 1 is protected by the second protection device. The threshold value tsth is set to be shorter the lower the outside air temperature TEMPo becomes by looking up a table shown in FIG. 17.

Next, a fifth embodiment will be described. The construction of the fifth embodiment is identical to that of the fourth embodiment. In the fifth embodiment, the outside air temperature TEMPos at the restart time and the variation in the outside air temperature TEMPo from stop to restart, are predicted, the energy E1 required when the first protection device is used and the energy E2 required when the second protection device is used are both computed, and the protection device which requires lesser energy is selected and used.

Figure 19:
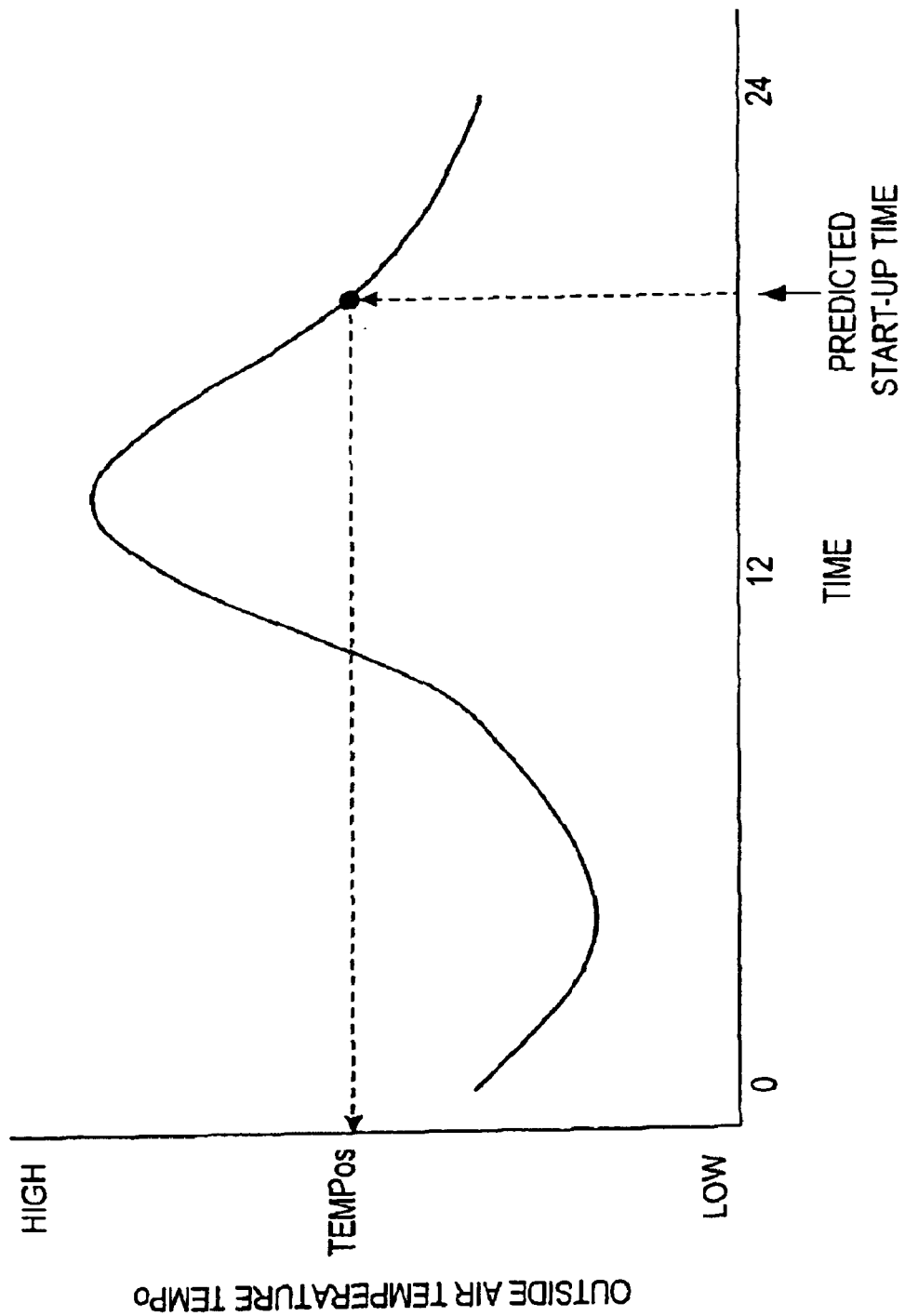
FIG. 19 shows the relation between time and outside air temperature.

As described above, the start-up time of the fuel cell stack 1 can be predicted the from the start-up frequency of the fuel cell stack 1 on different days of the week and at different times. As the outside air temperature TEMPo has a strong correlation with the time, if the outside air temperature TEMPo is first learned at each time, the outside air temperature TEMPos on restart may be predicted from the predicted start-up time. FIG. 19 shows the learning value of the outside air temperature. From the predicted start-up time and this learning value, the outside air temperature TEMPos can be predicted.

Figure 20:
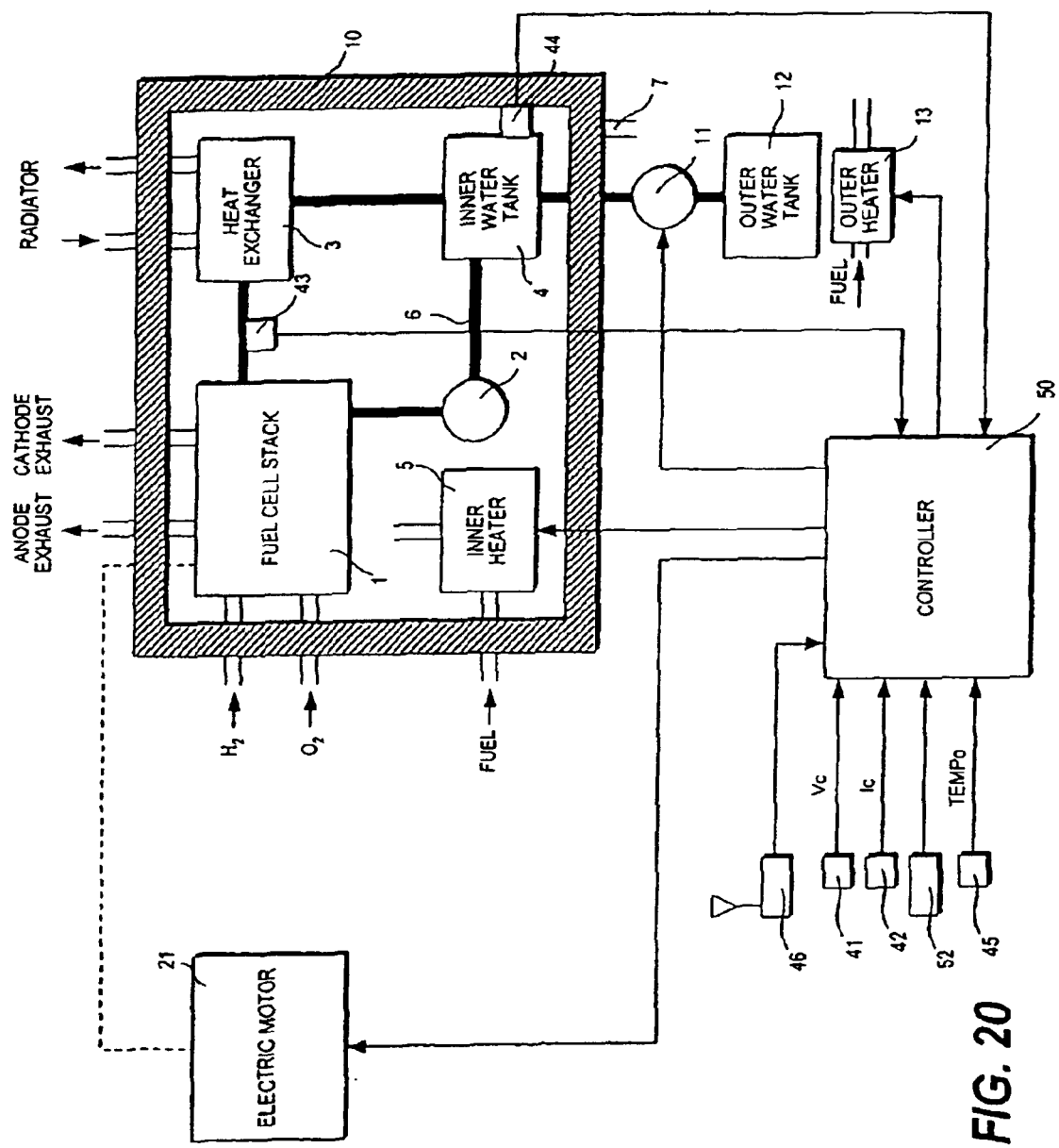
FIG. 20 is a diagram showing a variation of the fifth embodiment.

A receiver 46 such as a radio may further be added as shown in FIG. 20, a signal concerning future weather conditions and in particular, outside air temperature, can be received from outside by the receiver 46, and the outside air temperature TEMPos on restart predicted based on this signal.

Figure 21:
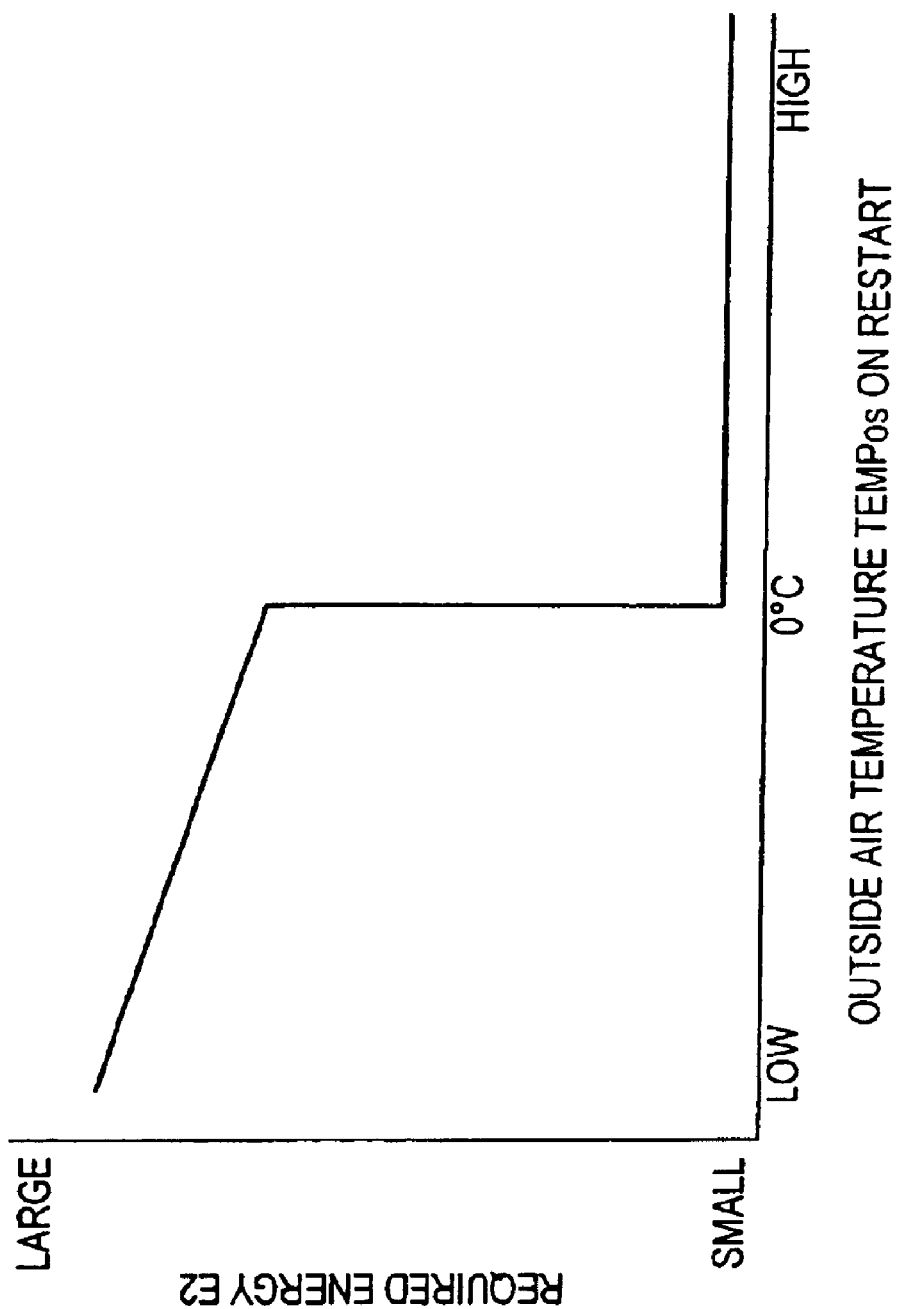
FIG. 21 shows the relation between the outside air temperature at the time of starting and the energy required for protection of the fuel cell stack when the second protection device is selected.

If the outside air temperature TEMPos on restart is predicted, the energy E2 required when the second protection device is selected, can be computed. FIG. 21 shows the relation between the outside air temperature TEMPos on restart and the energy E2 required to protect the fuel cell stack 1 when the second protection device is selected. When the outside air temperature TEMPos on restart, i.e., the temperature of the fuel cell stack 1, is higher than 0° C., the required energy E2 is only the energy needed to drive the pump 11. When the outside air temperature drops below 0° C., the energy required to thaw the pure water which has frozen is supplied by the outer heater 13, so the required energy E2 sharply increases. If the table shown in FIG. 21 is provided, the required energy E2 can be calculated by looking up this table.

Figure 22:
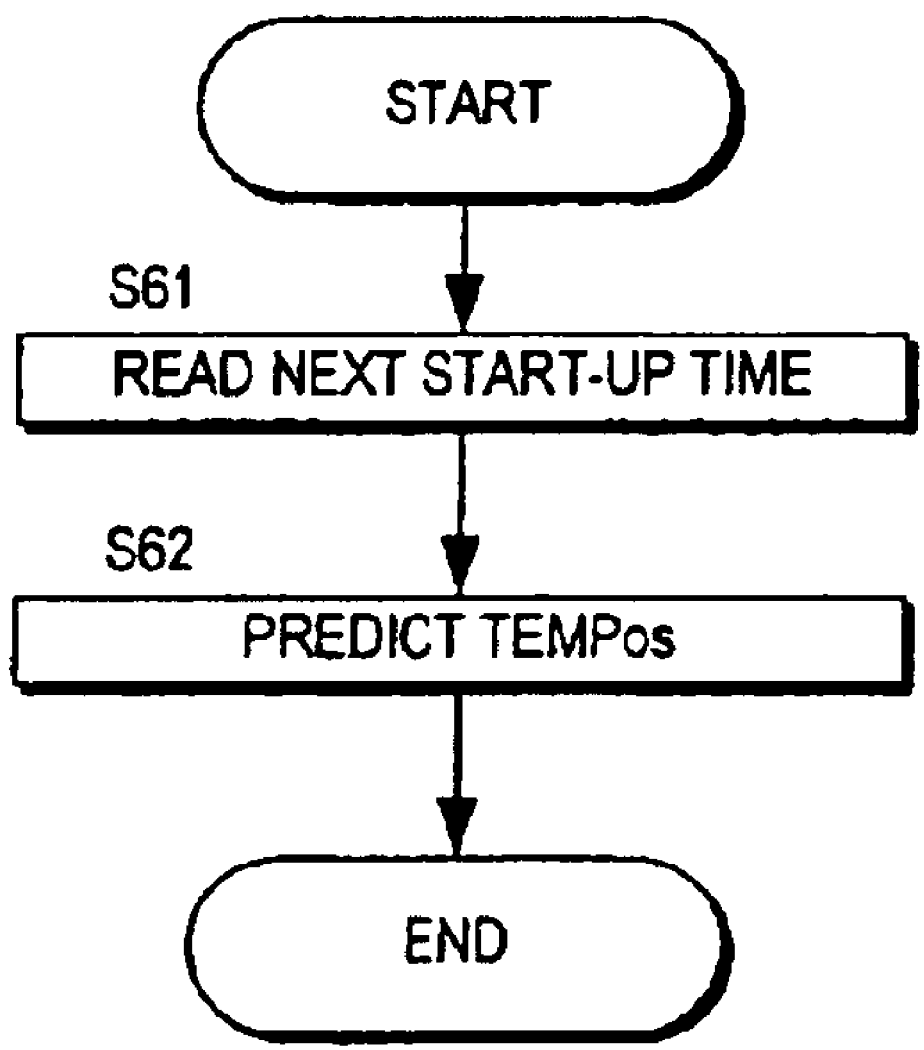
FIG. 22 is a flowchart of prediction processing of outside air temperature at the time of re-starting.

FIG. 22 is a flowchart showing the processing used to predict the outside air temperature TEMPos, and is performed in the controller 50.

According to this, in a step S61, the predicted start-up time of the fuel cell stack 1 is read, and in a step S62, the outside air temperature TEMPos on restart is predicted by looking up the learning value shown in FIG. 19.

Figure 23:
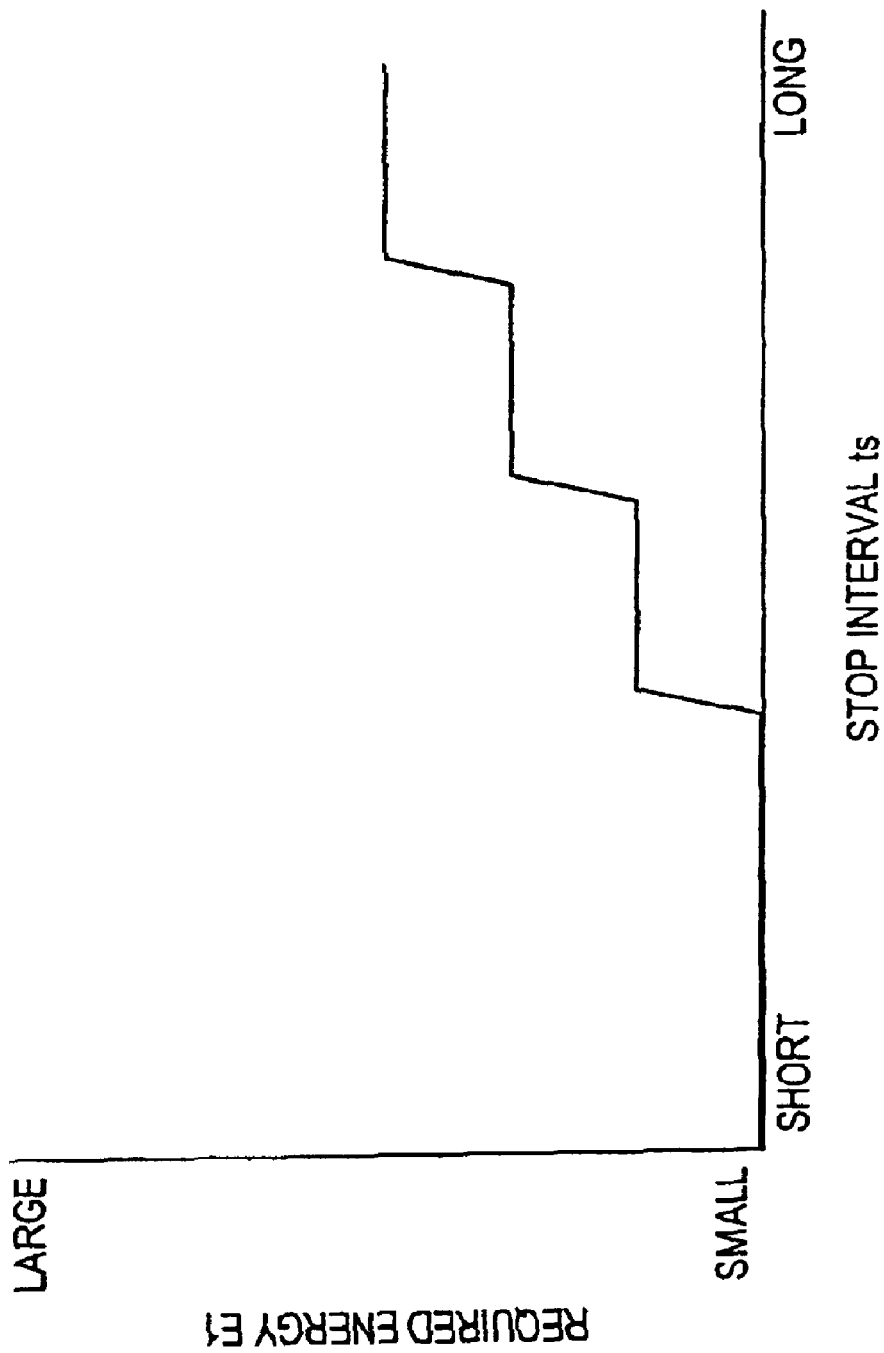
FIG. 23 shows a relation between stop interval and the energy required for protection of the fuel cell stack when the first protection device is selected.

On the other hand, the energy E1 required to protect the fuel cell stack 1 when the first protection device is selected, depends on the stop interval ts, and the variation of outside air temperature from the stop time to the start-up time. FIG. 23 shows the relation between the stop interval ts and the energy E1 required to protect the fuel cell stack 1. When the stop interval ts is short, the temperature of the fuel cell stack 1 does not fall to the vicinity of 0° C., so the required energy E1 is zero. When the stop interval ts is long, the required energy E1 increases. The inner heater 5 operates intermittently, so the required energy E1 increases in steps. The energy E1 required to protect the fuel cell stack 1 is equal to the heat amount released from the fuel cell stack 1 to the outside air. The energy released to the outside air may be calculated by the following equation.

$$Q = Hx \times S \times (TEMPc - TEMPo) \times \Delta T$$

where Q=heat release amount, Hx=heat transfer coefficient,
S=heat release surface area of the heat insulating case 10,
TEMPc=fuel cell temperature, TEMPo=outside air temperature,
ΔT=time interval The heat transfer coefficient Hx and heat release surface area S may be computed from characteristics such as the shape and materials of the heat insulating case 10. The total heat release amount until restart may be calculated by computing the heat release amount in the time interval Δt based on the predicted outside temperature TEMPo and integrating, taking the time interval Δt as one minute, for example. The variation of outside air temperature TEMPo from stop to restart can be predicted using the learning value of outside air temperature at each time. Alternatively, a signal concerning future weather conditions and in particular, outside air temperature, can be received from outside by the receiver 46, and the variation of the outside air temperature TEMPos predicted based on this signal. The energy required to maintain the temperature increases the lower the outside air temperature TEMPo becomes even if the stop time ts is identical. On the other hand, when the outside air temperature is below 0° C. for only part of the time during the stop interval, it is unnecessary to maintain the temperature when the outside air temperature is above 0° C., so the energy required to maintain the temperature during the whole of the stop time is less.

The energy E1 required when the first protection device is used and the energy E2 when the second protection device is used, calculated as described above, are compared, and the device which requires the lesser energy is selected. In this way, the energy required to protect the fuel cell stack 1 can be reduced.

Figure 24:
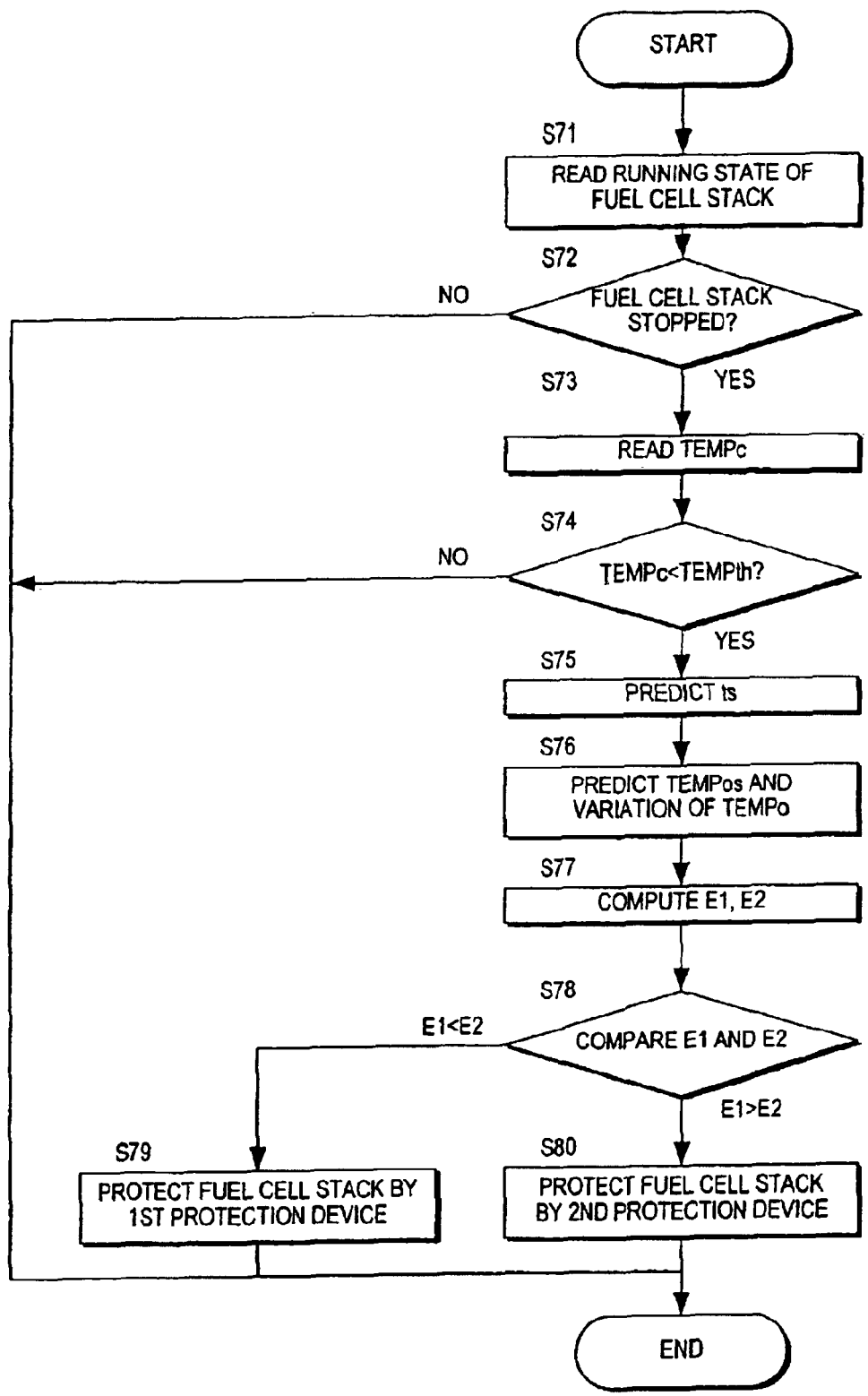
FIG. 24 is a flowchart of protection device selection processing according to the fifth embodiment.

FIG. 24 shows the protection device selection processing in a fifth embodiment, which is performed repeatedly at a predetermined interval in the controller 50.

According to this, in a step S71, the running state such as the voltage Vc and current Ic of the fuel cell stack 1 is read, and in a step S72, it is determined whether the fuel cell stack 1 has stopped based on the running state. When it is determined that the fuel cell stack 1 has stopped, the routine proceeds to a step S73 and the temperature TEMPc of the fuel cell stack 1 is read. In a step S74, it is determined whether the temperature TEMPc of the fuel cell stack 1 is less than the predetermined value TEMPth, for example, 2° C.

When it is determined that the temperature of the fuel cell stack 1 is lower than the predetermined temperature TEMPth, the routine proceeds to the step S75 and the stop interval ts of the fuel cell stack 1 is predicted. The method of predicting the stop interval ts is identical to that of the third embodiment, and the driver may input the stop interval ts. In a step S76, the outside air temperature TEMPos on restart is predicted by the above method, and the variation of the outside air temperature TEMPo from stop to start is predicted.

In a step S77, using the above computation method, the energy E1 required when the first protection device is used and the energy E2 required when the second protection device is used, are respectively computed.

In a step S78, the energy E1 required when the first protection device is used and the energy E2 when the second protection device is used, are compared, and when the required energy E1 is less than the required energy E2, the routine proceeds to a step S79 and protection is performed by the first protection device. If this is not the case, the routine proceeds to a step S80, and protection is performed by the second protection device.

Next, a sixth embodiment will be described. In this embodiment, even when it is determined that the stop interval of the fuel cell stack 1 is short and the first protection device is used, a change-over is made to protection by the second protection device if the stop interval is longer than the predicted stop interval and the remaining fuel amount is small.

Figure 25:
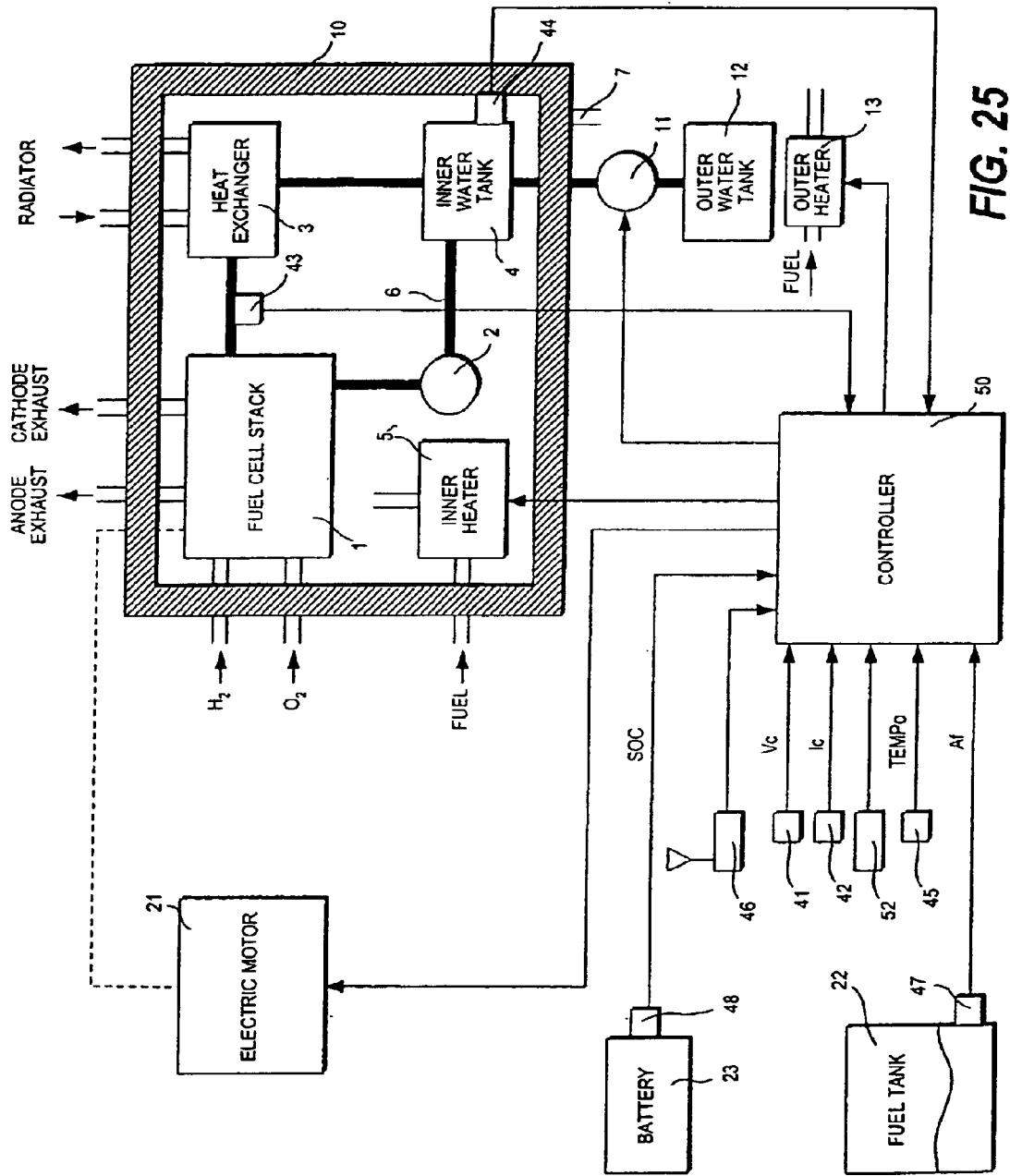
FIG. 25 shows a sixth embodiment of this invention.

FIG. 25 shows the construction of the sixth embodiment. A sensor 47 which detects the remaining amount in a fuel tank 22 which supplies fuel to the fuel cell stack 1, inner heater 5 and outer heater 13 is added to the fifth embodiment.

The selection of the first protection device and second protection device is performed by selecting the lesser of the required energies as in the fifth embodiment. However, when the stop interval of the fuel cell stack 1 is longer than the predicted interval, the fuel consumption amount is increased, so there is a possibility that the fuel in the fuel tank 22 will be exhausted if the first protection device continues to be used.

Thus, in this embodiment, when it is determined that a remaining amount Af of fuel in the fuel tank 22 is less than a determining value Afth, a change-over is made to protection by the second protection device even when the first protection device is being used.

Figure 26:
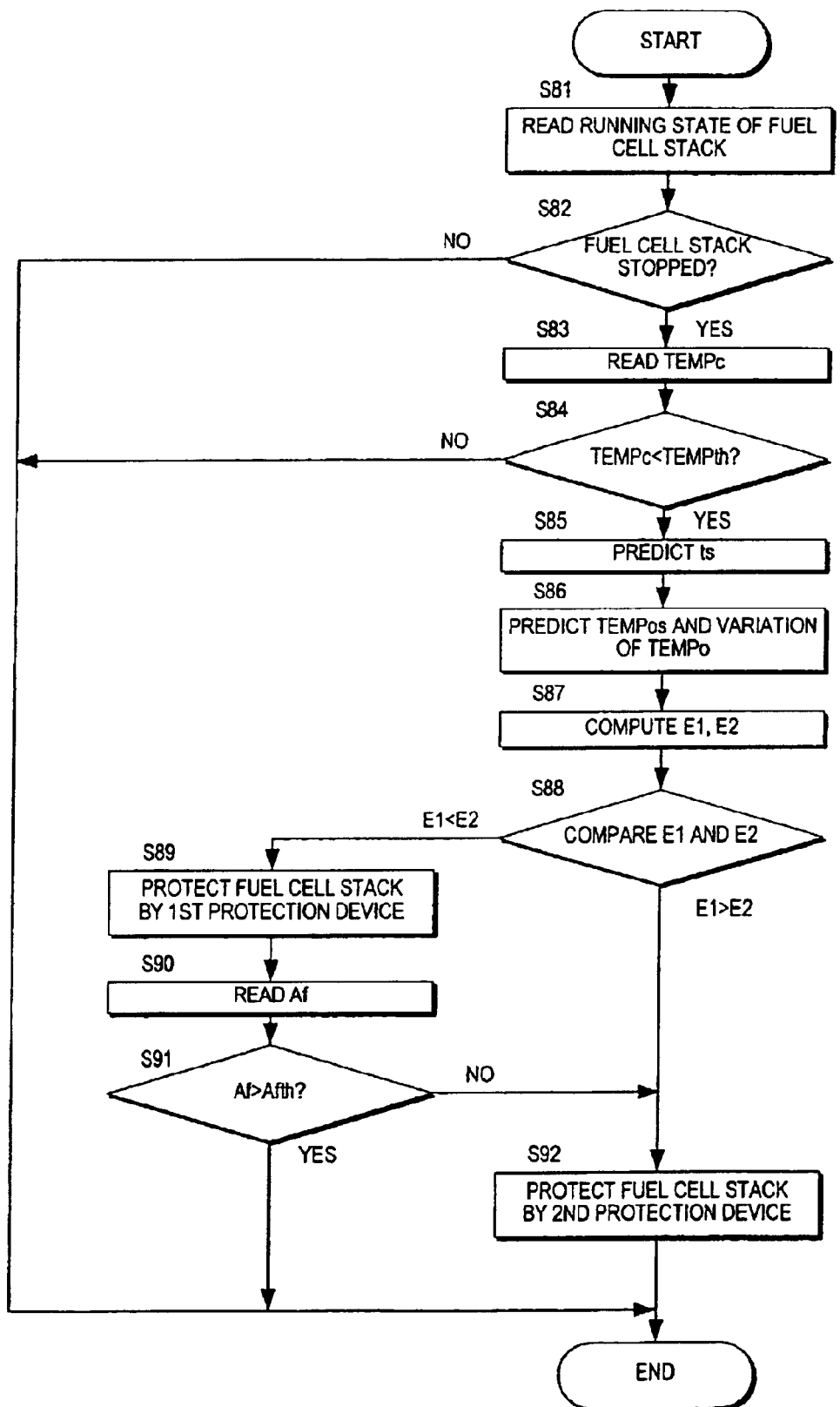
FIG. 26 is a flowchart of protection device selection processing according to the sixth embodiment.

FIG. 26 shows the protection device selection processing in the sixth embodiment, which is performed repeatedly at a predetermined interval in the controller 50.

According to this, in a step S81, the running state such as the voltage Vc and current Ic of the fuel cell stack 1 is read, and in a step S82, it is determined whether the fuel cell stack 1 has stopped based on this running state. When it is determined that the fuel cell stack 1 has stopped, the routine proceeds to a step S83 and the temperature TEMPc of the fuel cell stack 1 is read. In a step S84, it is determined whether the temperature of the fuel cell stack 1 is lower than the predetermined temperature TEMPth, for example 2° C. When it is determined that the temperature of the fuel cell stack 1 is lower than the predetermined temperature TEMPth, the routine proceeds to a step S85 and the stop interval ts of the fuel cell stack 1 is predicted. In a step S86, the outside air temperature TEMPos on restart and the variation of the outside air temperature TEMPo until restart are predicted. The method of predicting the stop interval ts, the method of predicting the outside air temperature TEMPos on restart and the method of predicting the variation of the outside air temperature TEMPo until restart, are identical to those of the aforesaid embodiments.

In a step S87, the energy E1 required when the first protection device is used and the energy E2 required when the second protection device is used are respectively computed. The computation methods are the same as those already described.

In a step S88, the energy E1 required when the first protection device is used and the energy E2 required when the second protection device is used are compared, and when the required energy E1 is less than the required energy E2, the routine proceeds to a step S89 and the fuel cell stack 1 is protected by the first protection device. In the other case, the routine proceeds to a step S92 and the fuel cell is protected by the second protection device.

In a step S90, the fuel amount Af remaining in the fuel tank 22 is read, and in a step S91, it is determined whether the remaining fuel amount Af is larger than the predetermined amount Afth. The predetermined amount Afth is the amount required to thaw the pure water frozen in the outer water tank 12 by the outer heater 13 on restart, and operate the fuel cell stack 1 so that the vehicle can be driven to the nearest gas station to refuel, and is set to, for example, 5 L.

When it is larger than the predetermined amount Afth, protection is continued by the first protection device, and when it is less than the predetermined amount Afth, the routine proceeds to a step S92, protection by the first protection device is interrupted, and protection by the second protection device is started.

In this embodiment, the outer heater 13 uses fuel, but identical control is performed when the outer heater 13 is an electrical heater driven by the power of a battery 23. In this case, when a state of charge SOC of the battery 23 detected by a sensor 48 becomes less than a predetermined value SOCth, a change-over is made from the first protection device to the second protection device.

Next, a seventh embodiment will be described. The construction of the seventh embodiment is substantially identical to that of the sixth embodiment. In this embodiment, a drop in oxygen concentration around the vehicle due to the use of oxygen by the inner heater 5 when the vehicle is parked in a closed space such as an indoor parking lot, is prevented.

Figure 27:
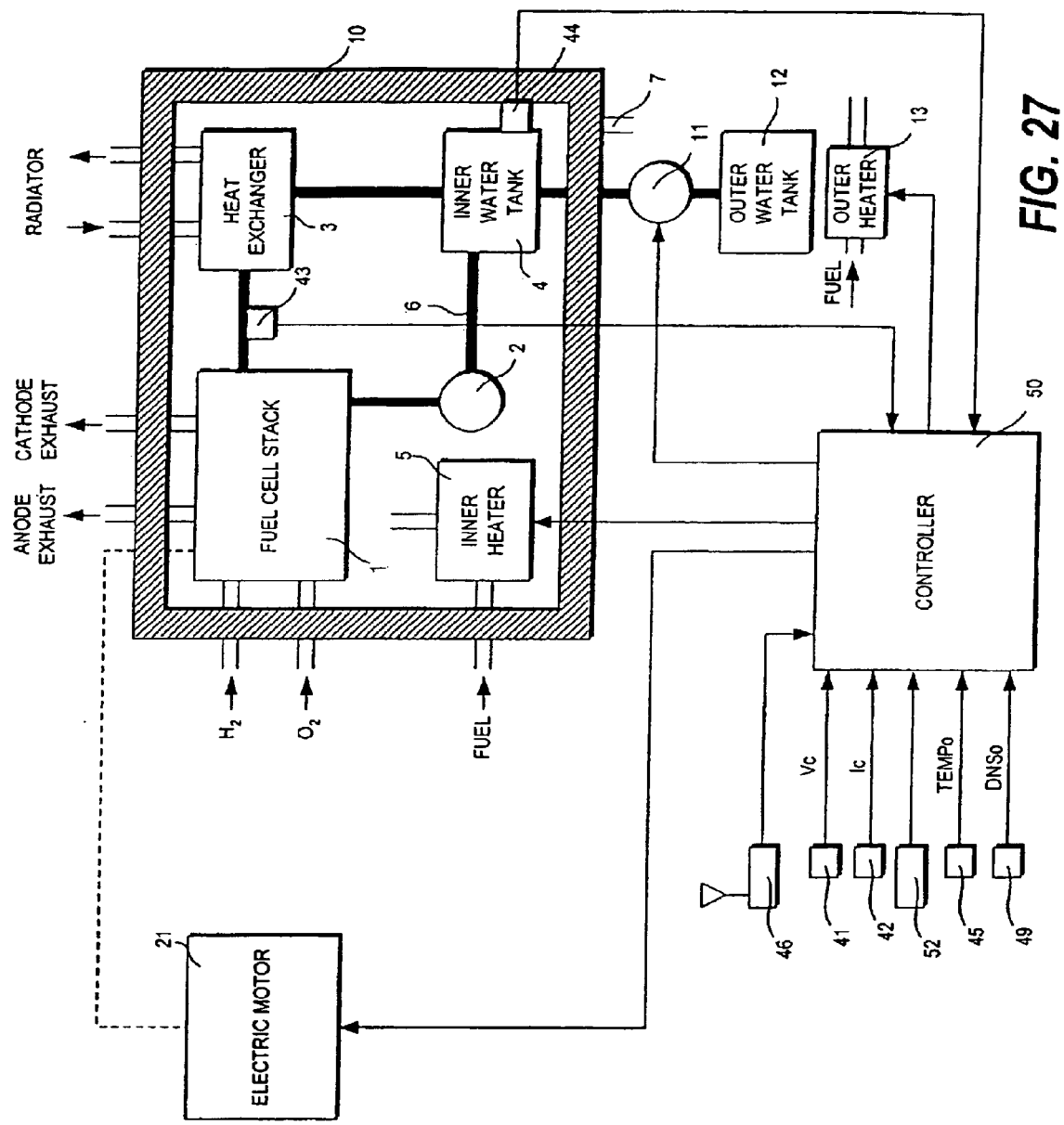
FIG. 27 shows a seventh embodiment of this invention.

FIG. 27 shows the construction of the seventh embodiment. A sensor 49 which detects an oxygen concentration DNSo of the outside air is added to the construction of the fifth embodiment.

When the first protection device is operating, the inner heater 5 is operated to maintain the temperature of the fuel cell stack 1 above 0° C. When the inner heater 5 uses a combustor or catalytic combustor, oxygen in the space is consumed. Therefore, if protection by the first protection device is performed for a long interval in a closed space, the oxygen concentration DNSo in the outside air falls. Hence, in this embodiment, the oxygen concentration DNSo in the space is detected, and when the oxygen concentration DNSo has become lower than a predetermined concentration DNSoth, a change-over is made from protection by the first protection device to protection by the second protection device.

Figure 28:
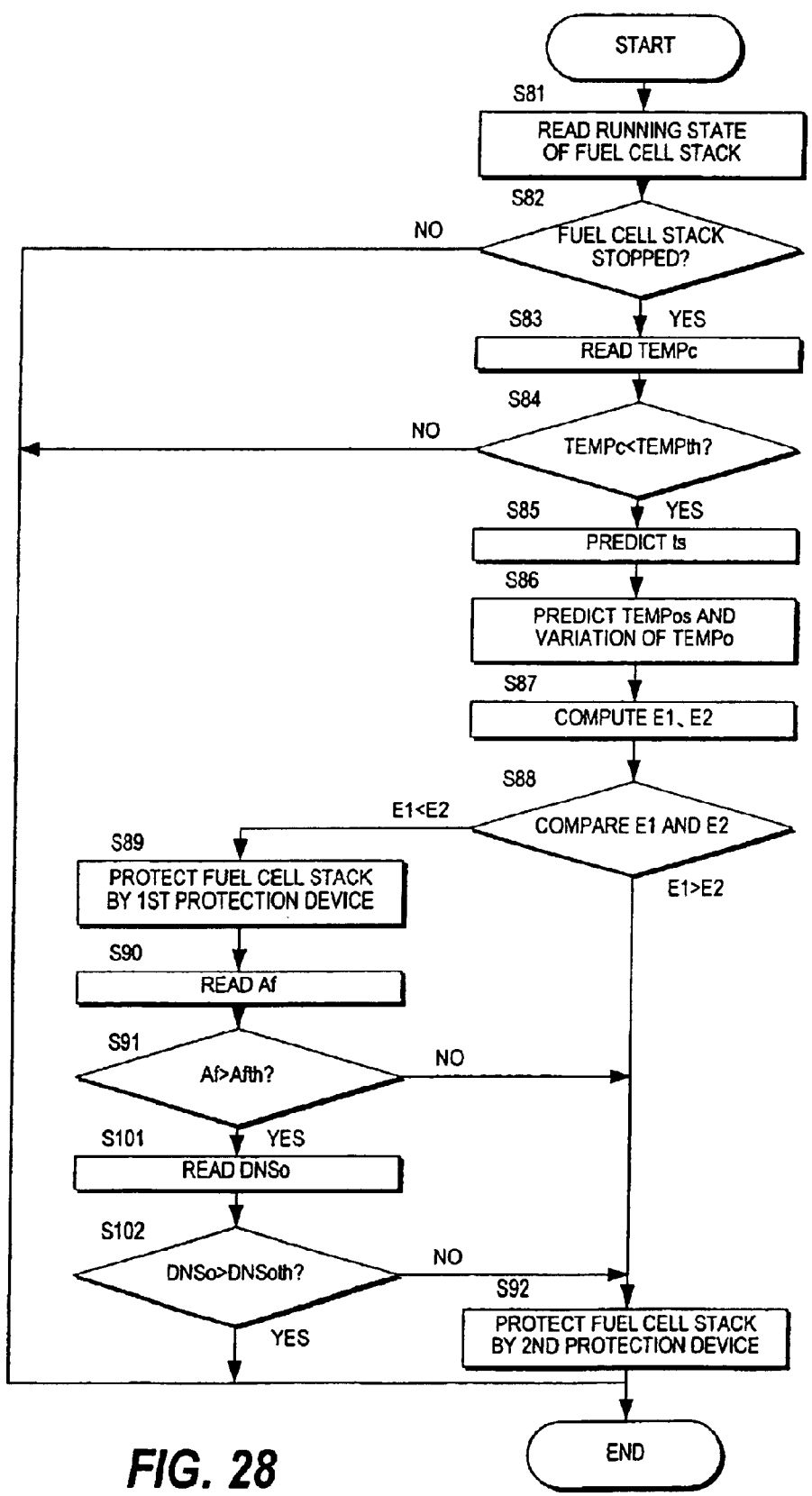
FIG. 28 is a flowchart of protection device selection processing according to the seventh embodiment.

FIG. 28 shows a flowchart of the protection device selection processing in the fifth embodiment, which is performed repeatedly at a predetermined interval in the controller 50.

Steps 101, 102 are added to the protection device selection processing of the sixth embodiment (FIG. 26).

In the step S101, the oxygen concentration DNSo is read. In the step S102, it is determined whether or not the oxygen concentration DNSo is higher than the predetermined concentration DNSoth. The predetermined concentration DNSoth is set at a level which is not dangerous for humans and animals, for example, 19%. When the oxygen concentration DNSo is higher than the predetermined concentration DNSoth, protection by the first protection device is continued. Conversely, when the oxygen concentration DNSo has fallen to below the predetermined concentration DNSoth, the routine proceeds to a step S92, protection by the first detective device is interrupted, and a change-over is made to protection of the second protection device.

Next, an eighth embodiment will be described. In the aforesaid embodiments, the first protection device and second protection device each comprise a water tank, but in this embodiment, the water tanks 4,12 are combined into one.

Figure 29:
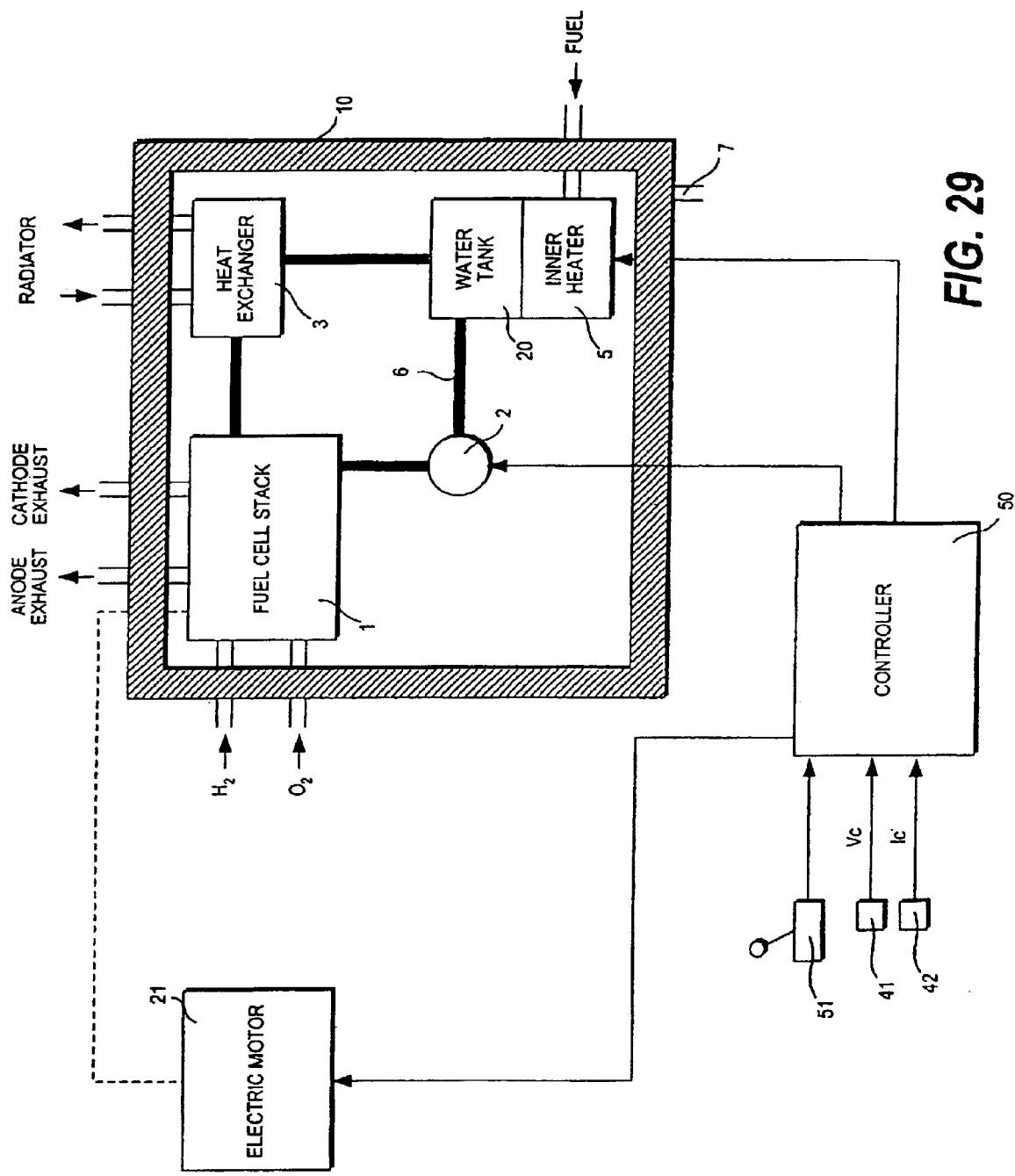
FIG. 29 shows an eighth embodiment of this invention.

As shown in FIG. 29, in the eighth embodiment, the inner water tank 4 and outer water tank 12 of the first embodiment are combined into one, and a single water tank 20 is installed in the heat insulating case 10. Further, the inner heater 5 is installed in the vicinity of the water tank 20 so that it can heat the water tank 20.

Figure 30:
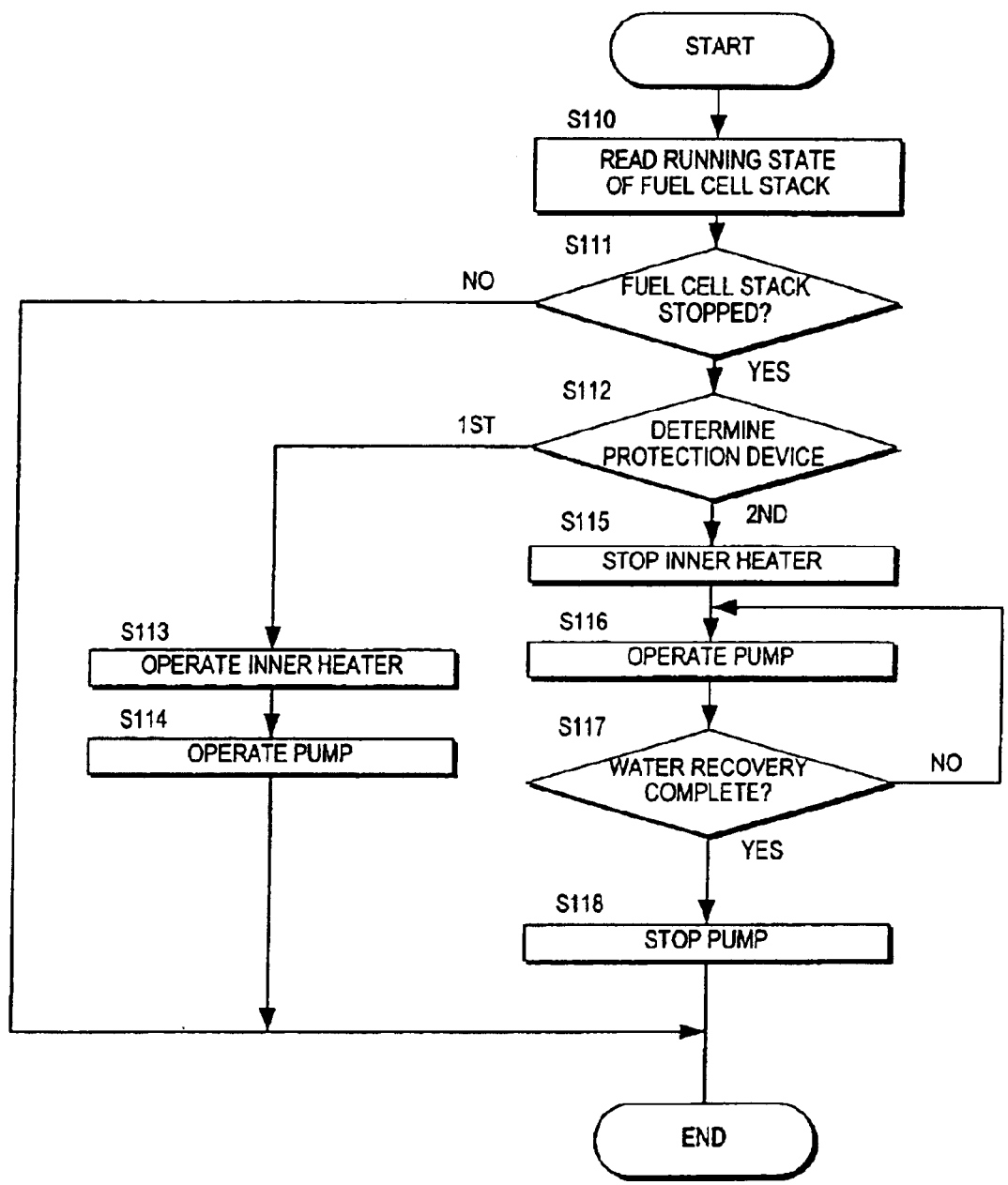
FIG. 30 is a flowchart of protection device selection processing according to the eighth embodiment.

FIG. 30 shows the protection device selection processing in the eighth embodiment, which is performed repeatedly at a predetermined interval in the controller 50.

According to this, in a step S110, the running state such as the voltage Vc and current Ic of the fuel cell stack 1 are read, and in a step S111, it is determined whether the fuel cell stack 1 has stopped based on the running state.

When it is determined that the fuel cell stack 1 has stopped, the routine proceeds to a step S112, and it is determined which protection device should be used. The determination of which protection device to use may employ any of the methods described above.

When protection is performed by the first protection device, i.e., by maintaining the temperature of the fuel cell stack 1, the routine proceeds to a step S113 and fuel is supplied to the inner heater 5, and in a step S114, the pump 2 is operated to circulate pure water.

On the other hand, when protection is performed by the second protection device, i.e., the fuel cell stack 1 is protected by draining pure water from the fuel cell stack 1, the routine proceeds to a step S115 and fuel supply to the inner heater 5 is stopped, and in a step S116, the pump 2 is operated to recover the pure water in the fuel cell stack 1 to the water tank 20.

When it is determined in a step S117 that recovery of pure water is complete, the routine proceeds to a step S118 and the pump 2 is stopped. As the total amount of pure water is approximately known, the determination of whether or not recovery of pure water is complete may be performed, for example, by determining that recovery is complete when the water level in the water tank 15 has risen above a predetermined level.

Although the invention has been described above by reference to a certain embodiment of the invention, the invention is not limited to the embodiment described above. Modifications and variations of the embodiments described above will occur to those skilled in the art, in the light of the above teachings. The scope of the invention is defined with reference to the following claims.

What is claimed is:

1. A fuel cell system, comprising:
   a fuel cell having a water passage and a passage for gas required to generate power,
   a first protection device which prevents freezing of water in the fuel cell by maintaining the temperature of the fuel cell,
   a second protection device which prevents freezing of water in the fuel cell by draining water in the fuel cell when the fuel cell stops running, wherein the second protection device comprises a vessel which reserves water drained from the fuel cell, and the second protection device returns water stored in the vessel to the fuel cell when the fuel cell restarts, and a controller functioning to:

select one of the first protection device and second protection device as the protection device to be used when the fuel cell has stopped, and protect the fuel cell by operating the selected protection device when the fuel cell has stopped.

2. The fuel cell system as defined in claim 1, wherein the first protection device comprises a heater which increases the temperature of the fuel cell.

3. The fuel cell system as defined in claim 2, wherein the first protection device comprises a heat insulator which suppresses temperature drop of the fuel cell.

4. The fuel cell system as defined in claim 2, wherein the first protection device controls the heater so that the temperature of the water is higher than 0° C.

5. The fuel cell system as defined in claim 1, comprising a thawing device which thaws the water frozen in the vessel.

6. The fuel cell system as defined in claim 5, further comprising a reformer which supplies reformate gas comprising hydrogen to the fuel cell, wherein the thawing device thaws the frozen water using the heat generated by the reformer.

7. The fuel cell system as defined in claim 1, wherein the water passage and gas passage are installed on either side of a porous member.

8. The fuel cell system as defined in claim 1, further comprising:

a humidifier which humidifies the gas supplied to the fuel cell, and a water recovery device which recovers water from the gas which has flowed out from the fuel cell.

9. The fuel cell system as defined in claim 1, further comprising:

a sensor which measures the temperature of the fuel cell, and wherein the controller further functions to protect the fuel cell by the first protection device or the second protection device when the temperature of the fuel cell is lower than a predetermined temperature.

10. The fuel cell system as defined in claim 9, wherein the sensor which detects the temperature of the fuel cell is a sensor which measures the temperature of the water flowing through the fuel cell.

11. The fuel cell system as defined in claim 1, wherein the controller further functions to:

select the first protection device when the stop interval of the fuel cell is shorter than a predetermined interval, and select the second protection device when it is longer than the predetermined interval.

12. The fuel cell system as defined in claim 11, further comprising a sensor which measures the outside air temperature, and wherein the controller further functions to set the predetermined interval to be shorter the lower the outside air temperature becomes.

13. The fuel cell system as defined in claim 11, wherein the stop interval of the fuel cell is the time from when the fuel cell stops generating power to when it starts on the next occasion.

14. The fuel cell system as defined in claim 11, wherein the controller further functions to:

predict the restart time of the fuel cell based on past information relating to the start time of the fuel cell, and computes the stop interval of the fuel cell based on the stop time and predicted restart time of the fuel cell.

15. The fuel cell system as defined in claim 11, further comprising an input device for inputting the stop interval of the fuel cell.

16. The fuel cell system as defined in claim 1, further comprising a manually operable selector which selects one of the first protection device and second protection device, and wherein the controller further functions to select the protection device selected by the selector.

17. The fuel cell system as defined in claim 1, wherein the controller further functions to:

compute an energy required when the fuel cell is protected using the first protection device, compute an energy required when the fuel cell is protected using the second protection device, and select the one of the first protection device and second protection device which has the lesser required energy.

18. The fuel cell system as defined in claim 17, wherein the controller further functions to:

predict a variation of outside air temperature during the stop interval of the fuel cell, and compute the energy required when the fuel cell is protected using the first protection device based on the variation of outside air temperature during the predicted stop interval.

19. The fuel cell system as defined in claim 18, wherein the controller further functions to:

predict the variation of outside air temperature during the stop interval based on past information relating to the variation of outside air temperature.

20. The fuel cell system as defined in claim 18, further comprising a receiving device which receives a signal relating to future outside air temperature from outside the system, and the controller further functions to:

predict the variation of outside air temperature during the stop interval based on the signal received by the receiving device.

21. The fuel cell system as defined in claim 17, wherein the controller further functions to:

predict an outside air temperature at the restart time, and compute the energy required when the fuel cell is protected using the second protection device based on the predicted outside air temperature at the restart time.

22. The fuel cell system as defined in claim 21, wherein the controller further functions to:

predict the outside air temperature at the restart time from the correlation between time and outside air temperature.

23. The fuel cell system as defined in claim 21, further comprising a receiving device which receives a signal relating to future outside air temperature from outside the system, and the controller further functions to:

predict the outside air temperature at the restart time based on the signal received by the receiving device.

24. The fuel cell system as defined in claim 2, further comprising:

a storage device which stores fuel supplied to the heater, and a sensor which detects a remaining fuel amount in the storage device, and the controller further functions to:

stop protection by the first protection device, and start protection by the second protection device, when the detected remaining fuel amount is lower than a predetermined amount even when protection is being performed by the first protection device.

25. The fuel cell system as defined in claim 2, further comprising:
   a battery which supplies electricity to the heater, and
   a sensor which detects a charge state of the battery, and the controller further functions to:
   stop protection by the first protection device, and start protection by the second protection device, when the detected charge state is lower than a predetermined value even when protection is being performed by the first protection device.

26. The fuel cell system as defined in claim 2, further comprising:
   a sensor which detects an oxygen concentration in the outside air, and the controller further functions to:
   stop protection by the first protection device, and start protection by the second protection device, when the detected concentration is lower than a predetermined concentration even when protection is being performed by the first protection device.

27. A fuel cell system, comprising:
   a fuel cell having a water passage and a passage for gas required to generate power,
   first protection means which prevents freezing of water in the fuel cell by maintaining the temperature of the fuel cell,
   second protection means which prevents freezing of water in the fuel cell by draining the water in the fuel cell when the fuel cell stops running, wherein the second protection means comprises a vessel which reserves water drained from the fuel cell, and the second protection means returns water stored in the vessel to the fuel cell when the fuel cell restarts, and
   means which selects one of the first protection means and second protection means as the protection means to be used when the fuel cell has stopped.

* * * * *